US010694526B2

(12) United States Patent
Nguyen et al.

(10) Patent No.: US 10,694,526 B2
(45) Date of Patent: Jun. 23, 2020

(54) ADAPTIVE PURSUIT LEARNING METHOD TO MITIGATE SMALL-CELL INTERFERENCE THROUGH DIRECTIONALITY

(71) Applicants: Drexel University, Philadelphia, PA (US); University of Oulu, Linnanmaa (FI)

(72) Inventors: Danh H. Nguyen, Philadelphia, PA (US); Anton Paatelma, Oulu (FI); Harri Saarnisaari, Oulu (FI); Nagarajan Kandasamy, Philadelphia, PA (US); Kapil R. Dandekar, Philadelphia, PA (US)

(73) Assignees: Drexel University, Philadelphia, PA (US); Univeristy of Oulu, Linnanmaa (FI)

( * ) Notice: Subject to any disclaimer, the term of this patent is extended or adjusted under 35 U.S.C. 154(b) by 0 days.

(21) Appl. No.: 15/720,951

(22) Filed: Sep. 29, 2017

(65) Prior Publication Data
US 2018/0098330 A1   Apr. 5, 2018

Related U.S. Application Data

(60) Provisional application No. 62/402,671, filed on Sep. 30, 2016.

(51) Int. Cl.
*H04W 72/02* (2009.01)
*H04W 72/08* (2009.01)
(Continued)

(52) U.S. Cl.
CPC .......... *H04W 72/082* (2013.01); *G06N 7/005* (2013.01); *G06N 20/00* (2019.01);
(Continued)

(58) Field of Classification Search
CPC ..... G06N 99/005; H04L 41/16; H04L 43/087; H04W 16/06; H04W 16/26;
(Continued)

(56) References Cited

U.S. PATENT DOCUMENTS

| 2013/0095774 A1* | 4/2013 | Gulati | H04B 1/44 455/78 |
| 2016/0157195 A1* | 6/2016 | Wang | H04W 56/001 370/350 |
| 2017/0013572 A1* | 1/2017 | Jayaraman | H04W 56/001 |

OTHER PUBLICATIONS

Andrews et al., "Femtocells: Past, present, and future", IEEE Journal on Selected Areas in Communications, 2012, 30(3), 497-508.

(Continued)

*Primary Examiner* — Steven H Nguyen
(74) *Attorney, Agent, or Firm* — BakerHostetler

(57) ABSTRACT

A learning protocol for distributed antenna state selection in directional cognitive small-cell networks is described. Antenna state selection is formulated as a nonstationary multi-armed bandit problem and an effective solution is provided based on the adaptive pursuit method from reinforcement learning. A cognitive small cell testbed, called WARP-TDMAC, provides a useful software-defined radio package to explore the usefulness of compact, electronically reconfigurable antennas in dense small-cell configurations. A practical implementation of the adaptive pursuit method provides a robust distributed antenna state selection protocol for cognitive small-cell networks. Test results confirm that directionality provides significant advantages over omnidirectional transmission which suffers high throughput reduction and complete link outages at above-average jamming or cross-link interference power.

20 Claims, 15 Drawing Sheets

(51) Int. Cl.
| | |
|---|---|
| *H04W 74/04* | (2009.01) |
| *H04W 72/04* | (2009.01) |
| *H04W 16/06* | (2009.01) |
| *G06N 20/00* | (2019.01) |
| *H04L 12/26* | (2006.01) |
| *G06N 7/00* | (2006.01) |
| *H04W 16/26* | (2009.01) |
| *H04W 56/00* | (2009.01) |
| *H04L 12/24* | (2006.01) |
| *G06N 3/12* | (2006.01) |

(52) U.S. Cl.
CPC ........... *H04L 43/087* (2013.01); *H04W 16/06* (2013.01); *H04W 72/0446* (2013.01); *H04W 74/04* (2013.01); *G06N 3/123* (2013.01); *H04L 41/16* (2013.01); *H04W 16/26* (2013.01); *H04W 56/001* (2013.01)

(58) Field of Classification Search
CPC ........... H04W 56/001; H04W 72/0446; H04W 72/082; H04W 74/04
See application file for complete search history.

(56) References Cited

OTHER PUBLICATIONS

Andrews et al., "What will 5G be?", IEEE Journal on Selected Areas in Communications, 2014, 32(6), 1065-1082.
Auer et al., "Finite-time analysis of the multi-armed bandit problem", Machine Learning, 2002, 47(2-3), 235-256.
Bao et al., "Transmission scheduling in ad hoc networks with directional antennas," in Proc. Of Acm Mobicom '02, 2002, 11 pages.
Bhushan et al., "Network densification: the dominant theme for wireless evolution into 5G", IEEE Communications Magazine, Feb. 2014, 52, 82-89.
Chen et al., "Learning in Vehicular Dynamic Spectrum Access Networks: Opportunities and Challenges", in Proceedings of ISPACS, 2011, 6 pages.
Choudhury, et al., "Using Directional Antennas for Medium Access Control in Ad Hoc Networks," in Proc. Of ACM MobiCom '02, 2002, 59-70.
Djukic et al., "Soft-TDMAC: A software-based 802.11 overlay TDMA MAC with microsecond synchronization," IEEE Transactions on Mobile Computing, 2012, 11, 478-491.
Gai, et al., "Learning multiuser channel allocations in cognitive radio networks: a combinatorial multi-armed bandit formulation," in Proc. Of IEEE DySPAN '10, 2010, 9 pages.
Gossain, et al., "Minimizing the effect of deafness and hidden terminal problem in wireless ad hoc networks using directional antennas," Wireless Communications and Mobile Computing, 2006, 6(7), 917-931.
Gulati et al., "Learning state selection for reconfigurable antennas: a multi-armed bandit approach," IEEE Transactions on Antennas and Propagation, 2014, 62(3), 1027-1038.
Korakis, et al., "A MAC protocol for full exploitation of directional antennas in ad-hoc wireless networks," in Proc. Of ACM MobiHoc '03, 2003, 10 pages.
Koulouriotis et al., "Reinforcement learning and evolutionary algorithms for non-stationary multi-armed bandit problems", Applied Mathematics and Computation, 2008, 196(2), 913922.
Lai et al., "Asymptotically Efficient Adaptive Allocation Rules", Advances in Applied Mathematics, 1985, 6, 4-22.
Lai, et al., "Cognitive medium access: Exploration, exploitation, and competition," IEEE Transactions on Mobile Computing, 2011, 10(2):239-253.
Mitola, "Cognitive Radio: an Integrated Agent Architecture for Software Defined Radio", PhD thesis, KTH, 2000, 313 pages.
Mukherjee et al., "Learning Algorithms for Energy-Efficient Mimo Antenna Subset Selection: Multi-Armed Bandit Framework," in Proceedings of the 20th European Signal Processing Conference (Eusipco), pp. 659-663, 2012.
Nasipuri, et al., "A MAC Protocol for Mobile Ad Hoc Networks Using Directional Antennas," in Proc. Of IEEE INFOCOM, 2000, 1214-1219.
Navda et al., "Mo bi Steer: using steerable beam directional antenna for vehicular network access," in Proc. Of ACM MobiSys '07, 2007, 192-205.
Newman et al., "Population Adaptation for Genetic Algorithm-based Cognitive Radios", in Proc. Of Crowncom, 2007, 279-284.
Nguyen, et al., in "A Real-Time and Protocol-Aware Reactive Jamming Framework Built on Software-Defined Radios," in Proc. Of ACM SRIF '14, 2014, 15-22.
Niu et al., "A survey of millimeter wave communications (mmWave) for 5G: opportunities and challenges", Wireless Networks, 2015, 21(8), 2657-2676.
Patron et al., "Planar reconfigurable antenna with integrated switching control circuitry," in Proc. Of the 8th European Conference on Antennas and Propagation (EuCAP 2014), 2014, 2737-2740.
Raman et al., "Design and Evaluation of a new MAC Protocol for Long-Distance 802.11 Mesh Networks," in Proc. Of ACM Mobicom '05, 2005, 156-169.
Rieser, "Biologically inspired cognitive radio engine model utilizing distributed genetic algorithms for secure and robust wireless communications and networking", PhD thesis, 2004, 174 pages.
Rondeau, "Application of Artificial Intelligence to Wireless Communications", PhD thesis, 2007, 198 pages.
Takai, et al., "Directional virtual carrier sensing for directional antennas in mobile ad hoc networks," in Proc. Of ACM MobiHoc '02, 2002, 183-193.
Thierens, "An adaptive pursuit strategy for allocating operator probabilities", in Proc. Of ACM GECCO, 2005, 385-386.
Thomas et al., "Cognitive networks: Adaptation and learning to achieve end-to-end performance objectives", IEEE Communications Magazine, 2006, 44(12), 51-57.
Tuomivaara et al., "Demonstration of Distributed TDMA MAC Protocol Implementation with OLSR on Linux Enriched Warp," in Proc. Of ACM Mobicom '09, 2009, 85-86.
Volos et al., "Cognitive engine design for link adaptation: An application to multi-antenna systems," IEEE Transactions on Wireless Communications, 2010, 9(9), 2902-2913.
Yilmaz et al., "Joint Subcarrier and Antenna State Selection for Cognitive Heterogeneous Networks with Reconfigurable Antennas", IEEE Transactions on Communications, 2015, 4015-4025.
Zhang, "DTRA: Directional transmission and reception algorithms in WLANs with directional antennas for QoS support," IEEE Network, 2005, 19(3), 27-32.
Zhao, et al., "On myopic sensing for multi-channel opportunistic access: structure, optimality, and performance," IEEE Transactions on Wireless Communications, 2008, 7(12), 5431-5440.

* cited by examiner

ADAPTIVE PURSUIT LEARNING METHOD TO MITIGATE SMALL-CELL INTERFERENCE THROUGH DIRECTIONALITY

RELATED APPLICATION

The present application claims priority to and the benefit of U.S. patent application 62/402,671, "Adaptive Pursuit Learning Method to Mitigate Small-Cell Interference Through Directionality" (filed Sep. 30, 2016), the entirety of which application is incorporated herein by reference for any and all purposes.

GOVERNMENT RIGHTS

This invention was made with government support under grant CNS 1457306 awarded by the National Science Foundation. The government has certain rights in this invention.

TECHNICAL FIELD

The invention relates to methods for mitigating interference in data transmission systems and, more particularly, to methods for improving the performance of individual transmission links through machine learning-based antenna state selection to avoid link interference and to methods for improving total system throughput of a multi-link wireless network using synchronous directional transmission in the entire network.

BACKGROUND

Network densification—the practice of deploying more radio access nodes into a geographical area—is being considered as a cost and bandwidth-effective method to increase wireless network capacity. In a dense heterogeneous network, small-cell systems, (also known as femtocells) coexist and cooperate with high-power macrocells to serve users' traffic demands. To mitigate the interference problem in such a dense deployment, many advanced management techniques have been proposed, including those that use antenna directionality. By using directional antennas, small-cell network nodes can focus energy in only the intended direction, thereby creating less interference between links and more potential for spatial reuse. Nevertheless, bringing these techniques to practice has been challenging

SUMMARY

Beam-steering techniques using directional antennas are expected to play an important role in wireless network capacity expansion into 5G through ubiquitous small-cell deployment and millimeter wave (mmW) technology. A system and method are provided for use in such systems that address the above and other needs in the art so as to improve the performance of individual links (through machine learning-based distributed antenna state selection to avoid interference for that link). A multi-armed bandit for antenna state selection problem is used. However, unlike prior systems where only antenna selection at the receiver of a link is considered, the system and method described herein considers joint antenna selection at both the transmitter and the receiver of a link. Learning is carried out through a multi-phase distributed process, leveraging node synchronization and a separate control channel in the time domain. In contrast, prior art systems propose to solve the multi-armed bandit problem using solutions meant for stationary environment (i.e., assuming nothing changes over a really long time). The methods and systems described herein solve the multi-armed bandit problem using a dynamic solution, called adaptive pursuit, that is better suited for non-stationary environment (people moving around/blocking links, cars and scatters moving in the scene). Total system throughput of a multi-link wireless network is also improved through synchronous directional transmission in an entire network. The method and system described herein accomplishes this by using reconfigurable antenna at each node for directionality and applying a hybrid synchronization mechanism with link scheduling to fully synchronize all network nodes in the time domain. The hybrid method includes the steps of: synchronizing all access points (APs) using an Ethernet backbone and synchronizing all clients to their respective APs using wireless sync packets. Once time synchronization is achieved, link schedules can be delivered from APs to clients, and up/downlink wireless transmissions can be carried out at the appropriately scheduled time slot.

Beam-steering techniques using directional antennas are expected to play an important role in wireless network capacity expansion through ubiquitous small-cell deployment. However, integrating directional antennas into the existing wireless PHY and MAC stack of small cells has been challenging due to the added protocol overhead and lack of a robust antenna beam selection technique that can adapt well to environmental changes. Disclosed herein is the design, implementation, and evaluation of LinkPursuit, a novel learning protocol for distributed antenna state selection in directional small-cell networks. LinkPursuit relies on reconfigurable antennas and a synchronous Time-Division Multiple Access (TDMA) MAC to achieve simultaneous directional transmission and reception. Further, the system employs a practical antenna selection protocol based on the well known adaptive pursuit algorithm from the reinforcement learning literature. We implement a real-time prototype of LinkPursuit on the WARP platform and conduct extensive experiments to evaluate its performance. The empirical results show that appropriate use of directionality in Link-Pursuit can result in higher network sum rates than omnidirectional transmission under various degrees of cross-link interference.

The subject matter described herein further distinguishes from prior art systems and methods in at least three ways. First, the inventors present algorithmically a sequential learning method to achieve adaptive real-time selection of the optimal Tx-Rx antenna states for a given wireless link in the context of cognitive small-cell networks. The antenna state selection task is formulated as a non-stationary multi-armed bandit (MAB) problem, wherein the reward generating processes associated with the bandit's arms do not remain the same over time but undergo changes. The solution uses a reinforcement learning method called adaptive pursuit (see D. Thierens, "An adaptive pursuit strategy for allocating operator probabilities," In Proc. of ACM GECCO '05, pages 385-386, 2005) and relies on a direct and observable reward metric at the MAC layer: the packet delivery ratio (PDR). At each decision-making time epoch, a network node decides on the active antenna mode, based on observations of the outcomes from previous choices, with the objective to identify the optimal antenna state which maximizes link PDR. The metric maximized for a particular link can also include, but is not limited to, received signal-to-interference-and-noise ratio (SINR), channel qualities, bit error rate (BER), and packet error rate (PER).

Second, disclosed herein is a cognitive small-cell testbed on top of the Wireless open-Access Research Platform (WARP) (WARP Project. http://warpproject.org). This testbed, called WARP-TDMAC, integrates compact, electronically reconfigurable antennas into WARP's physical layer and implements a custom TDMA-style MAC layer to provide timing, synchronization, resource scheduling, and dynamic directionality to all radio nodes. This experimental testbed offers real-time scheduling of both time slots and antenna beam direction at millisecond granularity. This testbed is used to realize a practical implementation of the above adaptive pursuit antenna state selection method in an operational small-cell network setting.

Third, LinkPursuit as described herein provides a real-time antenna state selection protocol, adapted from the adaptive pursuit algorithm and tailored specifically for non-random access radio systems that operate in a scheduled and time-slotted manner. LinkPursuit is implemented on the WARP-TDMAC testbed and conduct a series of real-time over-the-air (OTA) experiments to quantify directional networking performance with respect to both omnidirectional transmission and less practical antenna state selection schemes. The experimental results show that LinkPursuit is highly resilient to both deliberate and unintentional co-channel interference, maintaining at a minimum 60% PDR for legitimate network links under varying degrees of interference. In this regard, the results confirm that directionality provides significant advantages over omnidirectional transmission which suffers high throughput reduction and complete link outages at above-average jamming or cross-link interference power.

Interference avoidance methods and apparatuses disclosed herein also tackle the interference problem and increase spatial reuse in indoor WLANs through synchronous directional transmissions with smart antennas. Specifically, a distributed directional antenna system comprises: (i) compact, pattern-reconfigurable antennas that can be electronically steered to maximize signal power in certain directions, (ii) a time slotted medium access control (MAC) protocol where multiple links can be scheduled for concurrent directional channel access on millisecond granularity, and (iii) a distributed antenna orientation algorithm based on machine learning to maximize the individual goodput of each link. Those skilled in the art of computer networks will appreciate that "goodput" is the application-level throughput (i.e. the number of useful information bits delivered by the network to a certain destination per unit of time). The amount of data considered excludes protocol overhead bits as well as retransmitted data packets.

Embodiments of the methods assume multiple directional AP-client links can be spatially packed and machine learning techniques are used to orient the antenna beams. Block acknowledgements are used to obtain steering outcomes and detect the corner cases where an optimal antenna configuration cannot be found. The APs coordinate with each other over an Ethernet backbone to exchange learning statistics (e.g., pursuit statistics) and avoid potential oscillation in finding an equilibrium for network-wide antenna configuration. The oscillation situation may happen when two or more APs are consistently greedy and keep optimizing only their own connections. The back-and-forth adjustments cause mutual interference to each other and prevent either of the APs to converge to an optimal state. In such cases, the Ethernet backbone may be used to negotiate a convergence policy.

Embodiments of the system described herein provide a holistic approach combining smart antennas, synchronous channel access, and an adaptive antenna beam steering mechanism. The system is implemented on software-defined radios to demonstrate the feasibility of dense spatial packing to maximize the network sum rate.

BRIEF DESCRIPTION OF THE DRAWINGS

Examples are described in conjunction with the associated figures, of which.

DETAILED DESCRIPTION

Figure 1:
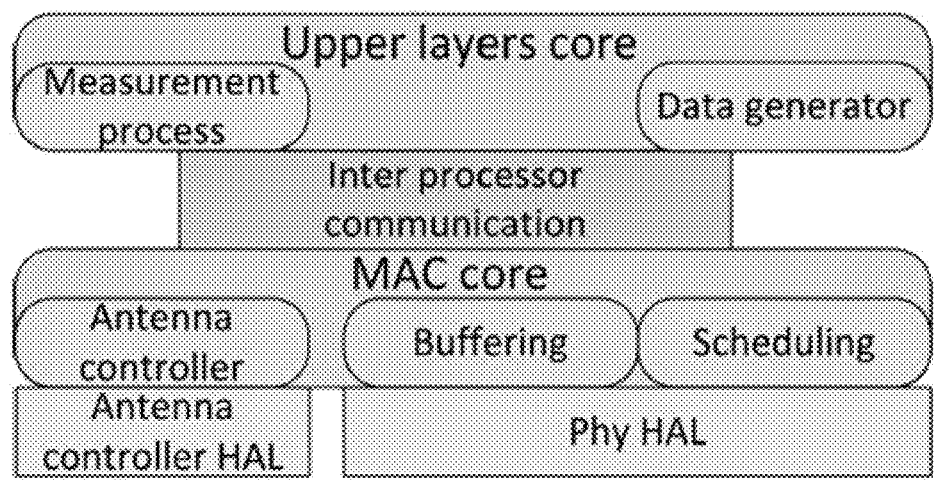
FIG. 1 illustrates an exemplary high-level architecture of WARP-TDMAC.
Figure 2:
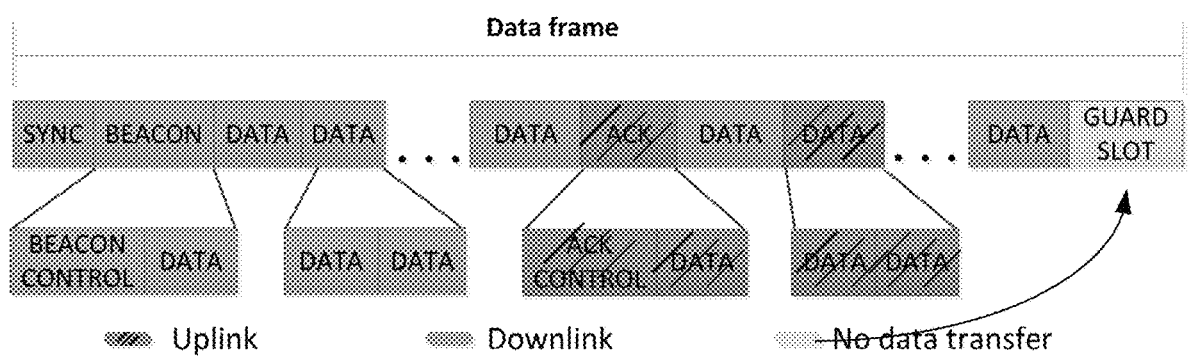
FIG. 2 illustrates an exemplary WARP-TDMAC frame structure.

Certain specific details are set forth in the following description with respect to FIG. 1-FIG. 10 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide examples, and the steps and sequences of steps should not be taken as required to practice the invention.

Conventional use of directional antennas to address network densification may be considered in effective. For example, the reasons may include: (i) the difficulty of integrating directional antennas into the existing wireless physical layer (PHY) and medium access control (MAC) stack of small cells, which typically use either Long-Term Evolution (LTE)-based or 802.11-based signaling for user data links, or (ii) the lack of robust antenna beam-steering (or beam selection) techniques that can cope well with the wireless channel's stochastic nature and dynamics in the operating environment of small cells.

These small cells typically constitute short-range (WiFi-like), low-power radio access nodes that are installed by consumers for better indoor voice and data services. Due to their shorter transmit-receive distance to users, small cells can greatly lower their transmit power and vary their signal bandwidth to achieve higher spectral efficiency and provide more opportunities for spatial reuse.

Despite their benefits, widespread small-cell deployment also poses a tremendous challenge in terms of interference management. The ad-hoc nature of small-cell networks gives rise to potentially stronger and less predictable interference patterns stemming from both cross-layer and co-layer uncoordinated transmissions. In this context, many advanced management techniques have been proposed to address the issue of small-cell interference; see Andrews et al., "Femtocells: Past, present, and future," IEEE Journal on Selected Areas in Communications, 30(3):497-508, 2012 and the references therein. Among them, interference mitigation techniques using directionality show great promise due to their low processing overhead and implementation complexity. By using directional antennas, small-cell network nodes can focus energy only in the intended direction, thereby creating less interference between links and more potential for spatial reuse. Further, with the steering of beams, nodes can also suppress unwanted emission and interference, thus effectively securing communications against eavesdroppers and jammers. Coupled with adaptive techniques of cognitive radios, directional antennas make possible the concept of a cognitive small-cell network-one that is capable of perceiving current network conditions and then adapting antenna beams accordingly to achieve its end goals.

Nevertheless, bringing these techniques to practice has been challenging for two reasons: the rare availability of a capable small-cell testbed that incorporates beam-steerable directional antennas, and the lack of robust antenna state selection techniques that can cope well with the wireless channel's stochastic nature and unpredictable variations in the operating environment of small cells. As a result, most interference mitigation techniques using directionality exist largely in simulation or non-real time environments.

Using Directional Antennas in Wireless Networks:

The problem of designing efficient MAC protocols with directional antennas for wireless ad hoc networks has been well studied. A substantial number of directional MAC protocols in the prior art belongs to the contention-based, random access category. These protocols mainly focus on modifying and extending IEEE 802.11 Distributed Coordination Function (DCF) for use with directional antennas, and they do not consider the case of controlled access or mobility in the context of cellular networks.

As explained herein, the present inventors have developed a cross-layer optimization approach nesting between PHY and MAC that is meant to support directional MAC protocols with synchronized channel access. The idea is to coordinate contention-free transmissions to occur simultaneously in an optimal way. Doing so usually requires synchronization among the nodes and is more suitable for cellular and small-cell access. Along this line, ROMA also explores multi-beam adaptive array for simultaneous transmissions in the same time slot. Other conventional implementations propose DTRA for coordinated transmissions using steerable antennas, using a frame-based approach to neighbor discovery, hand-shaking, and reservation. Also, a new MAC protocol called 2P has also been proposed for 802.11 mesh networks with long-distance links to enable simultaneous channel access over multiple hops. These approaches rely heavily on protocol coordination to schedule antenna directions and are usually not resilient to environmental changes.

Most of the directional MAC protocols discussed above are evaluated through simulations, using either QualNet or self-developed simulators. Measurement studies using actual directional antennas are rare. There are few experimental papers on this topic and they are still based primarily on 802.11 and thus do not consider the scenario of synchronized channel access. There are no experimental studies that incorporate beam-steerable directional antennas to optimize link throughput and enable concurrent access in the context of small cells.

Reinforcement Learning in Cognitive Radio Networks:

Stochastic online learning using reinforcement learning algorithms has recently gained significant attention in the wireless community. Rieser, "Biologically inspired cognitive radio engine model utilizing distributed genetic algorithms for secure and robust wireless communications and networking," PhD thesis, 2004, and Rondeau, "Application of Artificial Intelligence to Wireless Communications," PhD thesis, 2007, apply genetic algorithms to design cognitive radios that can adapt waveforms to operate reliably in unknown environments. However, learning appears to be offline and proceeds under the assumption that the environment remains static. Newman et al., "Population Adaptation for Genetic Algorithm-based Cognitive Radios," In Proc. of CROWNCOM '07, pages 279-284, 2007, and Chen et al., "Learning in Vehicular Dynamic Spectrum Access Networks: Opportunities and Challenges," In Proceedings of ISPACS '11, 2011, similarly use genetic algorithms to facilitate opportunistic spectrum access, but the authors only show their applications in a simulated network. The body of work on applying multi-armed bandit formulation in wireless communications is also rich, encompassing spectrum sensing, secondary user spectrum access, adaptive modulation and coding. However, these studies are also primarily theoretical and simulation-based. There are rare experimental studies using MAB with real measured channels for the problem of antenna state selection. The authors use WARPLab to send packets with different antenna modes and collect channel realizations. The learning algorithm then processes them offline. The antenna selection polices proposed also assume a non-varying channel, which is not suitable for real-world deployment. In contrast, the proposed learning policy described below operates in real time and adapts well to dynamic channel and interference conditions.

TDMA Implementation on SDRs:

TDMA provides a straightforward framework for testing cognitive radios and smart antennas in a mobile network setting. Existing implementations of TDMA on SDRs either rely on commercial off-the-shelf (COTS) devices to meet strict timing and synchronization requirements, or resort to using high-latency SDR platforms which provide limited synchronization resolution (e.g., milliseconds in some observed cases. For the capable WARP platform, the few existing TDMA-style protocol implementations all fall short in operational capabilities. They either operate in non-real time and require an Ethernet backbone for synchronization (e.g., IEEE Std 802.11-Part 11: Wireless LAN Medium Access Control (MAC) and Physical Layer (PHY) Specifications, 2012), or do not describe in details the sync mechanism, achieved precision, and any scheduling capability.

The small-cell interference mitigation disclosed herein expands on the prior art efforts noted above and realizes a flexible testbed that can offer microsecond synchronization, as well as real-time scheduling in both time slots and antenna directions at millisecond slot granularity, without the need for a wired backbone. These and other benefits and advantages will become apparent from the following descriptions of preferred embodiments.

Moreover, with the growing density and ubiquitous deployment of wireless networks, interference management becomes a critical problem for indoor wireless local area networks (WLANs). Unfortunately, the prevalent method of interference avoidance in WLANs—the 802.11 distributed coordination function (DCF)—scales poorly to maintain acceptable Quality of Service (QoS) and meet growing wireless capacity demands as the number of network nodes increases. Consequently, significant effort has been made to improve spatial reuse in indoor environments, e.g., increasing the number of successful concurrent transmissions in a given channel and coverage area.

The general idea of improving spatial reuse using directional transmissions has been applied extensively in outdoor settings through mechanisms such as cell sectoring in cellular networks and directional MAC in wireless ad hoc networks. The indoor application scenario, however, is distinctly more challenging. Due to the rich-scattering environment and chaotic node locations, the multipath channel and interference conditions become unpredictable and more varied, leading to severe performance loss for unmanaged directional transmissions. Several directional MAC protocols have been proposed for indoor deployment, including DIRC and Speed. These schemes rely on periodic received signal strength (RSS) measurements across all antenna orientations at both access points (APs) and clients to generate conflict graphs and schedule directional transmissions. In a fast-changing environment with client mobility and frequent handoffs, the cost of exhaustive RSS measurements becomes prohibitive.

Widespread deployment of indoor wireless LANs has brought about many advantages, but at the same time posed tremendous challenges for interference management and service scalability. One means to improve wireless capacity in dense deployments is through simultaneous directional transmissions and receptions, but there has yet to be a coordinated approach that can adapt well to fast-changing channel conditions. The distributed directional antenna system described in connection with preferred embodiments preferably enhances spatial reuse in indoor scenarios.

The next section (ANTENNA STATE SELECTION) develops the general adaptive pursuit learning solution for antenna state selection. The WARP-TDMAC testbed is described in the next section. The subsequent section (LINKPURSUIT PROTOCOL) describes the overall protocol including a practical implementation of the adaptive pursuit learning policy for antenna state selection in cognitive small-cell networks. The section after that (EXPERIMENTAL METHODOLOGY) discusses the methodology used in the experiments, and the final section (PERFORMANCE EVALUATION) presents the results, including the potential network sum-rate gains of the distributed directional antenna system over omnidirectional transmissions in a two-link interference scenario where both links are purposely scheduled to interfere in every data time slot.

Antenna State Selection

This section addresses the antenna state selection problem in the context of cognitive small-cell networks. Readers are first familiarized with the theory behind multi-armed bandit problems and then the specific problem of interest is addressed.

Multi-Armed Bandit Theory

In the classic multi-armed bandit problem described by R. S. Sutton and A. G. Barto in "Reinforcement Learning," MIT Press, Cambridge, Mass., 1998, an agent operates in an environment with incomplete information and is repeatedly faced with K arms or choices in a sequence of trials. At each time step t, the agent selects to play an arm, for which it receives a stochastic reward R(t). The agent's goal is to maximize the sum of the collected rewards at the end of T trials, $\Sigma_{t=1}^{T}R(t)$. The nature of the random reward for each arm is unknown to the agent a priori but is assumed to be independently drawn from a fixed, unknown distribution.

MAB represents the trade-off between exploitation and exploration in that the agent chooses (i) maximizing expected profit using current knowledge of the environment, achieved by selecting the currently perceived best arm, or (ii) trying to learn more about the environment by exploring other arms to improve the quality of its decisions. Thus, besides the cumulative reward, the performance of a stationary MAB selection policy can be measured in terms of regret, defined as the policy's expected loss in reward when compared to the best possible outcome, obtained by selecting the (unknown) optimal choice. Formally, the regret of a policy after l rounds is defined as $\theta(l)=\mu^* \cdot l - \Sigma_{i=1}^{K}\mu_i E[n_i(l)]$, where $\mu_i$ is the mean reward for arm i;

$$\mu^* = \max_{1 \leq i \leq K} \mu_i$$

is the maximum (but unknown) mean among all reward distributions of arms; and $n_i(l)$ is the number of times arm i has been played up to time slot l. $E[\cdot]$ is the expectation operator.

Lai and Robbins in "Asymptotically Efficient Adaptive Allocation Rules," Advances in Applied Mathematics, 6:4-22, 1985, showed that under certain regularity conditions, the optimal regret grows logarithmically with time, that is, $\theta(l)=\mathcal{O}(\log l)$. The Upper Confidence Bound (UCB) policy developed by Auer et al. in "Finite-time analysis of the multi-armed bandit problem," Machine Learning, 47(2-3): 235-256, 2002, has been shown to achieve this optimal regret rate using an exploitation versus exploration selection rule: if $\bar{\mu}_i(l)$ is the sample mean of all observed rewards for an arm up to time period l, the UCB1 policy selects the arm i that maximizes the quantity $$\bar{\mu}_i(l) + \sqrt{\frac{2\ln l}{n_i(l)}}$$

or the current time step. Apparently, the first term in this quantity favors exploitation (play the arm with the best empirical reward to date), whereas the second term enforces exploration (all arms must be played infinitely many times as the time index l→∞). It can be observed that UCB1 and its variants, UCB2 and UCB-Tuned by Auer et al. use deterministic operator selection rules to bound the regret growth rate. However, under a deterministic selection policy, the time gap between two selections of some under-optimal arm increases exponentially over time. Over a finite horizon—i.e., the MAB task only lasts for a finite number of trials—the number of times an under-optimal arm is selected can be arbitrarily low.

An important and challenging variation of the MAB problem arises in the context of dynamic environments, wherein the reward generating processes of the bandit's arms do not remain the same throughout the task but undergo changes. As reasoned above, most solutions for the stationary MAB problem do not consider changing reward distributions and thus fail to keep up with such changes. If a previously under-optimal arm suddenly becomes optimal, it necessarily takes a long time for a static MAB selection policy to reflect this trend. The frequency of environmental changes in a dynamic environment can cause a stationary MAB policy to be stuck in an adaptation loop and constantly select some mediocre arms that are far from optimal [D. E. Koulouriotis and A. Xanthopoulos, "Reinforcement learning and evolutionary algorithms for non-stationary multi-armed bandit problems," Applied Mathematics and Computation, 196(2):913-922, 2008]. Prior work in the area of applying MAB techniques to dynamic wireless networks often overlook this issue of non-stationary operating conditions.

A family of ad-hoc learning methods are well-suited for the non-stationary bandit problem, including "ε-greedy action selection, softmax action selection, probability matching, and adaptive pursuit methods. Though these methods do not aim to balance exploration and exploitation in a sophisticated way, they also do not rely on strong assumptions (such as the assumption of i.i.d distribution of rewards generated by each arm), and they can be fine-tuned to produce near-optimal results.

Problem Description

The antenna state selection process for cognitive small-cell links is formulated as a non-stationary MAB problem. Consider a small-cell network with an arbitrary number of base station (BS) and client pairs operating in the same wireless channel. The base stations can consist of all femtocells or a mix of an overlaid macrocell (the main BS) and auxiliary femtocells (the secondary base stations). Each BS serves a client for whom it would like to maximize the downlink throughput over a finite number of time slots. Here, it is assumed that the base stations are greedy in terms of optimizing their own link throughput and do not cooperate with each other. Thus, the nature of co-channel interference is less predictable and more varied—as femtocell base stations can join or leave the network, as well as perform concurrent transmission randomly in time and possibly in different directions. Besides friendly unintentional interference, the stations may also experience deliberate interference from hostile adversaries, thus further complicating the tasks of estimating the channel conditions and selecting the optimal antenna states. The following description focuses exclusively on downlink interference mitigation, but the learning framework presented can be generalized to handle the case of mixed downlink and uplink interference as well.

It is assumed that beam-steerable directional antennas are available at all base stations and clients in the cognitive small-cell network. In addition, all BS-client links operate in a time-slotted manner. At the beginning of each downlink time slot, the BS and client are presented with M and N possible antenna states, respectively. The BS selects a state for packet transmission, and the client selects one for reception in that time slot. In MAB terms, the combination of the Tx antenna state at the BS and Rx antenna state at the client forms an M×N choice (or arm) matrix $$A = \begin{pmatrix} a_{11} & \cdots & a_{1N} \\ \vdots & \ddots & \vdots \\ a_{M1} & \cdots & a_{MN} \end{pmatrix}.$$

For practicality, it is further assumed that the BS and client through coordination can share information on their individually observed network conditions and jointly make a choice on their respective antenna states. After making a choice in time slot t, the BS-client link receives a numerical reward R(t) depending on the selected arm $a_{ij}$ in that time slot. In this description, PDR is used as the reward metric and it is assumed that the reward in time slot t for some selected antenna state $a_{ij}$ is drawn from an unknown Bernoulli distribution: with probability $\mu_{ij}(t)$ the packet is received successfully, that is, R(t)=1; otherwise, R(t)=0. Further, the reward distribution mean for each arm aij changes over time, that is, $\exists t_1, t_{2 \in [1}, T]$ and $t_1 \neq t_2$, such that $\mu_{ij}(t_1) \neq \mu_{ij}(t_2)$.

An objective of the invention is to develop a robust antenna state selection strategy that can adapt well to the changes in the reward distributions while at the same time maximizing the expected reward output.

Adaptive Pursuit Solution

To address the non-stationary MAB problem formulated above for the antenna state selection task, the adaptive pursuit strategy is used due to its fast convergence toward the currently optimal solution, as noted by D. E. Koulouriotis and A. Xanthopoulos. Originally proposed for learning automata, the adaptive pursuit strategy is a probabilistic selection policy; it identifies at each time step the optimal selection probability $P_{ij}(t)$ for every antenna state $a_{ij}$ such that the expected cumulative reward is maximized at the end of the run. The arms' selection probabilities are specified in an operator probability matrix $$P(t) = \begin{pmatrix} P_{11}(t) & \cdots & P_{1N}(t) \\ \vdots & \ddots & \vdots \\ P_{M1}(t) & \cdots & P_{MN}(t) \end{pmatrix},$$

where $0 \leq P_{ij}(t) \leq 1$ and $\Sigma_{i,j} P_{ij}(t) = 1$. Toward this reward maximization goal, the adaptive pursuit algorithm maintains an operator quality matrix $$Q(t) = \begin{pmatrix} Q_{11}(t) & \cdots & Q_{M1}(t) \\ \vdots & \ddots & \vdots \\ Q_{M1}(t) & \cdots & Q_{MN}(t) \end{pmatrix}$$

that keeps a running estimate of the reward for each arm. Whenever arm (antenna state) $a_{ij}$ is played, its current reward estimate $Q_{ij}(t)$ is updated with the corresponding received reward R(t) using an exponential, weighted averaging mechanism as:

$$Q_{ij}(t+1) = (1-\alpha)Q_{ij}(t) + \alpha R(t),$$

where the adaptation rate $\alpha$, $0<\alpha\leq 1$ discounts the past reward estimates obtained for arm $a_{ij}$.

At each time step t, the adaptive pursuit method selects the operator $a_{i*j*}$ that currently has the maximum estimated reward $Q_{i*j*}(t)$, using a "winner take all" strategy: it increases the selection probability of the best arm toward $P_{max}$ while decreasing all other selection probabilities toward $P_{min}$, $0<P_{min}<P_{max}<1.^2$ The selection probabilities for the next time slot are updated as follows:

$$P_{i*j*}(t+1)=P_{i*j*}(t)+\beta[P_{max}-P_{i*j*}(t)],$$

for $i*j*=\mathrm{argmax}_{ij}\{Q(t)\}$ $$P_{ij}(t+1)=P_{ij}(t)+\beta[P_{min}-P_{ij}(t)], \forall ij\neq i*j*$$

under the constraint $P_{max}=1-(M\cdot N-1)P_{min}$. The learning rate $\beta$ determines the convergence speed and accuracy, and the constraint ensures that if $\Sigma_{i,j}P_{ij}(t)=1$, the sum of the updated selection probabilities equals one in the next time step. The adaptive pursuit policy is summarized for small-cell antenna state selection in exemplary Algorithm 1 below:

---
Algorithm 1
Adaptive Pursuit Selection Policy [9]
---

Input: M, N, $P_{min}$, $\alpha$, $\beta$

Output: $\{a_{\overline{ij}}\}$ ▷Series of antenna states to select

1: $P_{max} \leftarrow 1 - (M \cdot N - 1) P_{min}$; $t \leftarrow 0$
2: for i $\leftarrow$ 1 to M do ▷Initialize P and Q matrices
3:    for j $\leftarrow$ 1 to N do
4:      $P_{ij}(0) \leftarrow \dfrac{1}{M \cdot N}$; $Q_{ij}(0) \leftarrow 1.0$
5:    end for
6: end for
7: while NOTTERMINATED( ) do ▷Main loop
8:    $a_{\overline{ij}} \leftarrow$ PROPORTIONALSELECTSTATE(P(t))
9:    $R(t) \leftarrow$ GETREWARD$(a_{\overline{ij}})$ ▷Update rewards
10:   $Q_{\overline{ij}}(t+1) = (1-\alpha)Q_{\overline{ij}}(t) + \alpha R(t)$
11:   $i*j* = \mathrm{ARGMAX}_{ij}(Q(t+1))$ ▷Update prob. of sel.
12:   $P_{i*j*}(t+1) = P_{i*j*}(t) + \beta[P_{max} - P_{i*j*}(t)]$
13:   for i $\leftarrow$ 1 to M do
14:     for j $\leftarrow$ 1 to N do
15:       if ij $\neq$ i*j* then
16:         Pij(t+1) $\leftarrow P_{ij}(t) + \beta[P_{min} - P_{ij}(t)]$
17:       end if
18:     end for
19:   end for
20:   t $\leftarrow$ t + 1 ▷Advance time index
21: end while

---

To increase spatial packing efficiency and avoid interference, each individual AP-client link may employ an antenna orientation algorithm to autonomously steer the nodes' antenna beams in a way that maximizes (e.g., ideally improves) the link goodput. The antenna orientation process is formulated as a non-stationary multi-armed bandit problem and the adaptive pursuit method from reinforcement learning is applied to solve it. As an example, consider what happens at the beginning of a downlink time slot for a particular AP-client link: the AP is presented with M possible antenna states (orientations) for transmission, and the client has N antenna states for reception. After making a Tx and Rx orientation choice in time slot t, the AP-client link receives a numerical reward R(t), which is selected to be the (downlink) packet delivery ratio (PDR), depending on the selected antenna states. The goal of the link is to orient its constituent nodes' antennas in each time slot so that the expected cumulative reward is maximized (e.g., improved) at the end of the run.

The adaptive pursuit strategy is a probabilistic selection policy; it identifies at each time step the reward-maximizing selection probability distribution over all antenna state combinations, and then proceeds to select the antenna states randomly according to that distribution. Adaptive pursuit has been shown to be well-suited for non-stationary environments, in which the reward generating processes associated with the antenna orientations do not remain the same over time. Furthermore, it can be fine-tuned to produce near optimal results. Initial experimental results show that our distributed directional antenna system is highly resilient to both deliberate and unintentional co-channel interference, maintaining at a minimum 60% PDRs for all network links under varying degrees of interference.

WARP-TDMAC Small-Cell Testbed

The testbed, WARP-TDMAC, is a directional cognitive small-cell testbed implemented on top of the WARP platform and targeted specifically for small-cell research. The inventors augment the FPGA-based, SISO, 802.11a/g standard-compliant physical layer with reconfigurable antennas and custom software layers to realize WARP-TDMAC. Using this platform, a wide range of small-cell network services are provided such as the time synchronization between femto base stations and clients, resource scheduling, and programmable antenna directionality. FIG. 1 shows the high-level system architecture.

Dynamic directionality is achieved through the use of compact pattern-reconfigurable antennas. These antennas provide inherent space and cost benefits by integrating multiple radiating elements on a single device, thereby enabling steerable directed beams with a reduced number of RF chains and lower processing overhead. These properties make reconfigurable antennas an ideal technology to be integrated into mobile devices and software-defined radio (SDR) testbeds. The reconfigurable antenna implementation is based on the planar reconfigurable Alford Loop antenna design, which can radiate in both an omnidirectional pattern and as well as in four directional beams at 90° separation with controllable beam widths. The antennas are integrated into the physical layer via a generic 16-pin GPIO header connecting directly to the antenna control circuitry and programmable via a shared register.

The software framework includes a TDMA-based MAC layer and various upper-layer functions implemented using Microblaze cores. The MAC layer includes the time-critical mechanisms for physical layer control, time synchronization, time-frequency-space resource scheduling, packet buffering, and support for application-specific MAC code. The upper network layers handle auxiliary, non-time-critical functionalities, such as traffic generation, logging, and measurement routines. Synchronization is achieved following a Sync packet sent by a single "main" BS (a macrocell) at the beginning of each frame. This control packet signals all other network nodes slave base stations as well as clients to start their hardware timers to achieve a common time base. A software-polled technique in the MAC code is used to read the PHY-supplied microsecond time stamp of the start of Sync packet reception defined in 802.11 standards as the instant when the SIGNAL field is successfully decoded, and configure the hardware timer to interrupt at the beginning of the next time slot. With negligible propagation delay, as is typical in an indoor environment where femtocells operate, this technique can achieve microsecond-level synchronization with high fidelity among all receiver nodes.

One challenge in achieving network-wide synchronization, however, is for the main base station sending the Sync packet to itself synchronize with the rest of the network. This is achieved by empirically measuring the processing delay between the time the main base station's MAC hands over the Sync packet for PHY transmission to the time the packet reception starts at a receiver. This period, measured to be 27 µs, usually remains constant and therefore does not require recalibration. This additional delay is added in the timer wait time at the main base station.

A WARP-TDMAC frame starts with a Sync signal from the main BS, followed by a number of resource slots, and ends with a guard time slot. Each resource slot is further broken down into two time slots that can be used to send different packet types. This dual time-slot approach to forming the resource blocks is used to increase the granularity of resource scheduling thereby reducing protocol overhead. WARP-TDMAC supports four types of resource slots: Beacon, Ack, Data, and Empty. Beacon resource slots are reserved for a base station to send Beacon control packets to pass control information, link schedules, as well as link statistics. Ack resource slots are used by clients to send Ack packets to establish and maintain their presence to the BS. Each control packet occupies only a single time slot, freeing up the other time slot in the resource block for additional data transmission. Data slots are used for data transfer in the downlink or uplink directions. An example WARP-TDMAC frame structure in shown in FIG. 2. Currently the length of each time slot is set to 1.6 ms to provide extra slack for MAC protocol processing and DMA data transfer between the PHY buffers and MAC buffers. The WARP-TDMAC frame shown in FIG. 2 contains 16 Data resource slots and lasts for 59 ms including all processing delays.

LinkPursuit Protocol

LinkPursuit is a practical adaptation of the antenna state selection algorithm presented above for real-time cognitive small-cell networks. The protocol is well suited for non-random access radio systems that operate in a time-slotted manner, as is typical in modern cellular networks that employ Long Term Evolution (LTE) technology.

LinkPursuit implements a distributed version of the adaptive pursuit algorithm to select the optimal antenna state at each time slot on a per-link (which BS-client pair) and per-direction (uplink or downlink) basis. With integrated reconfigurable antennas, M=N=4, indicating the four available directional modes at 90° separation with controllable beam widths at each network node. The pursuit parameters are set by default to be $\alpha=0.05$, $\beta=0.1$, and $P_{max}=0.9$. The minimum selection probability Pmin can then be calculated using the constraint laid out above. These parameters are chosen based on practical observations of the protocol performance. In LinkPursuit, every node in the network maintains two link-state tables for each of its unicast links: a Send table to derive the optimal antenna state for packet transmission to its link counterpart and a Receive table to derive the optimal antenna state for packet reception from that node. For a downlink transmission, the BS will use its Send table, and the client will use its Receive table to select the optimal antenna states at both ends in any given time slot.

Each Send and Receive table contains two matrices: an antenna state selection probability matrix P, and an antenna state quality matrix Q which keeps track of the reward estimates for all state combinations. These matrices follow the same definitions laid out in the adaptive pursuit algorithm explained above. Again, in a downlink scenario, assuming that the BS and the client have M and N available antennas states, respectively, entries in the BS's send-table matrix contain the pursuit statistics for arm $a_{ji}$ which represents the combination of the BS's Tx antenna state i and the client's Rx antenna state j. Similarly, the BS's Receive table is used in an uplink transmission and the corresponding matrix entries contain pursuit statistics for arm $a_{ji}$ which is the combination of the client's Tx antenna state j and BS's Rx antenna state i.

Once synchronization is achieved with the radio network, a node can obtain the resource allocation schedules through Beacons and know when it is supposed to receive a packet. This scheduling information forms the basis for our reward metric based on packet delivery ratio (PDR): if a packet is not successfully received in a time slot in which a node is scheduled to receive, the node perceives a reward of 0. Otherwise, it receives a reward of 1. The major components of the LinkPursuit protocol are summarized below.

Updating Pursuit Statistics

Since the reward metric is the PDR, the actual outcome of the reward-whether a packet is received or not-in each time slot is observable only by the link receiver. Therefore, the Receive table at the receiver node gets updated continuously following each transmission, whereas the Send table at the transmitter node is updated only when the receiver passes its most recent Receive table via a control packet. Essentially, the Send table at the transmitter is a cached copy of the Receive table maintained online at the receiver. It is important to maintain coherency between the transmitter's Send table and receiver's Receive table, that is, not let them drift too far apart in time without periodic updates, as they independently supply the pursuit statistics for distributed selection of sending antenna state at the transmitter and receiving antenna state at the receiver.

Figure 3:
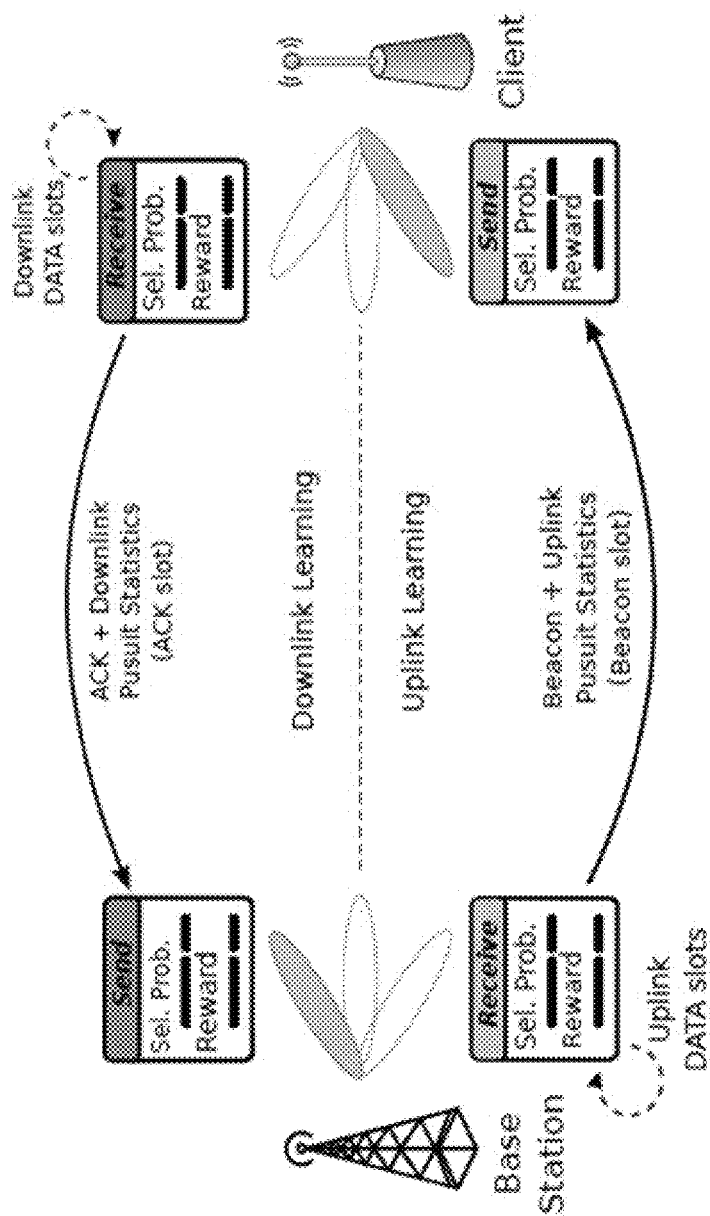
FIG. 3 illustrates pursuit statistics tables at the base station and the client, and the update process.
Figure 4:
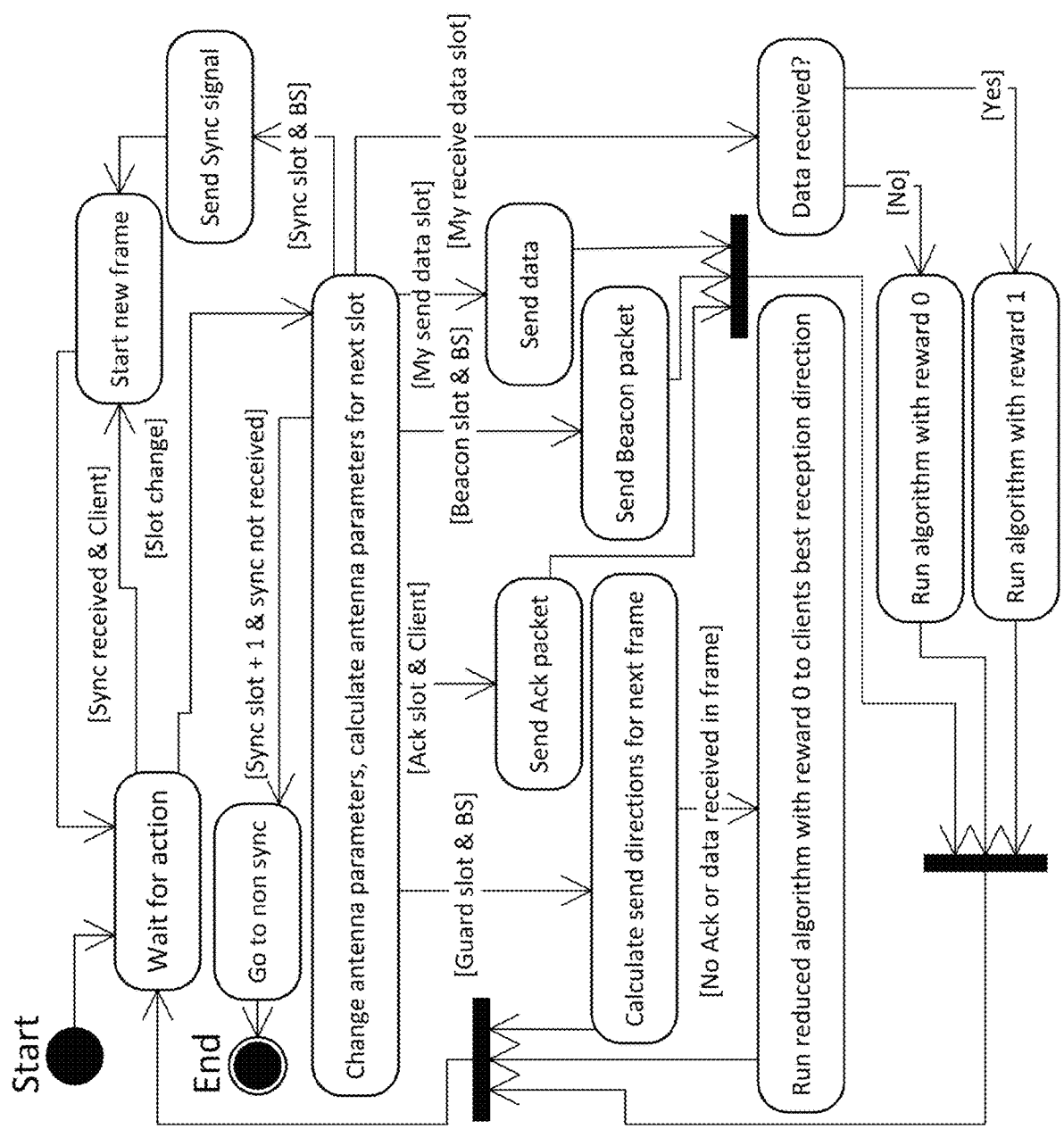
FIG. 4 illustrates an example of the learning process.

In an example, the client maintains real-time downlink pursuit statistics in its Receive table, and it passes this table in Ack packets to the BS, embedded in the packet payload, to update the BS's Send table. Similarly, the BS passes the uplink pursuit statistics stored in its Receive table in the Beacon packet to the client to update the latter's Send table. The pursuit statistics tables and their update processes are shown in FIG. 3. In FIG. 3, the pursuit tables that maintain identical statistics at the opposite links have the same shading.

Distributed Antenna-State Selection

LinkPursuit is a distributed protocol in that the transmitter and receiver can select their respective antenna states individually and not at the same time. The adaptive pursuit algorithm assumes that in each time slot, both the BS and client jointly select an arm $a_{ij}$, the combination of Tx antenna state i and Rx antenna state j, from a joint probability distribution specified by the operator probability matrix P. However, this is not feasible in practice due to the prohibitive overhead of maintaining an up-to-date P at both link ends and jointly performing the selection in each time slot. To reduce the antenna state search space and coordination overhead, LinkPursuit divides the joint antenna state selection process into two separate phases, one for Tx and the other for Rx antenna selection, following the Bayes' theorem for conditional probabilities:

$$Pr(S \cap R) = Pr(S) \cdot Pr(R|S)$$

where S and R are random variables representing the Tx and Rx antenna states, respectively. As a result, the Tx antenna state in time slot t is selected randomly according to the pursuit marginal distribution of sending modes $P^S(t)$, specified as:

$$P_i^S(t) = Pr(S = i) = \sum_{j=1}^{N} P_{ij}(t), \, i = 1, \ldots, M$$

The Rx antenna state is then selected from the pursuit conditional distribution of receive modes given a preselected sending mode $i (1 \leq i \leq M)$, specified as:

$$P_j^R(t) = Pr(R = j | S = i) = \frac{Pr(S = i \cap R = j)}{Pr(S = i)} = \frac{P_{ij}(t)}{P_i^S(t)},$$
$$j = 1, \ldots, N$$

This decoupled antenna state selection process has multiple possible advantages, such as the following two. First, it allows LinkPursuit to significantly minimize protocol overhead. Instead of simultaneously selecting Tx and Rx antenna states in each time slot, and then exchanging information over the air to carry out that joint decision at both link ends, the transmitter can preselect a send mode for that time slot randomly based on its local pursuit statistics and independent of the receiver's selected receive mode. Second, since the link's Send table stored at the transmitter is up-dated less frequently (on the order of once per protocol frame) than the Receive table at the receiver, one may efficiently preselect the send modes for all of the link's packets scheduled in the frame all at once at the beginning of protocol frame. Though preselecting the send modes using a single snapshot of the pursuit statistics may make the send-mode selection phase less agile to intra-frame environmental changes, this design is pursuant to the update frequency of pursuit statistics at the link transmitter, and the relatively lower change speed of the marginal distribution PS(t) with respect to the joint distribution P(t). Furthermore, the link receiver can still select a receive mode unilaterally given the chosen send mode in each time slot, using the most up-to-date Receive table to better track and reflect environmental variations.

The base station selects send modes for all uplink and downlink Data packets in the frame since it has relevant pursuit statistics in both its downlink Send table and uplink Receive table at the beginning of frame. The BS then aggregates the preselected send mode information in the frame's link schedule and broadcasts to the entire network via its Beacon packet. Referencing the link schedule, a network-synchronized BS or client will be able to extract the preselected send mode for use when it is scheduled to transmit or receive. If scheduled to be the receiver in a given time slot, the node can select a receive mode knowing the scheduled send direction and its current Receive table. The scheduled send direction is also used to update the reward outcome in that time slot.

In addition to aggregating the preselected send modes with link schedules, LinkPursuit also puts this information in the actual packet data by augmenting the MAC header with an 8-bit send mode field which should be filled in by the transmitter prior to every packet transmission. This field is usually used when a client receives a data packet from the BS without any prior scheduling information-which happens when the client is not synchronized to the small-cell network. Using the send mode information obtained from the received packet as well as the receive mode that was used for reception, the client can still update its reward matrix and proceed to select the next Rx antenna state that may help re-establish synchronization with the network.

Control Slot Optimization

The LinkPursuit learning protocol described thus far depends heavily on the reliability of the control channel which carries Sync, Beacon, and Ack messages. Transmission of control information is generally considered separate from the pursuit learning process, and thus probabilistic antenna state selection are not applied and the reward estimates associated with control packets are not updated. In practice, the control channel can be well separated in frequency from the data channel, making the optimal antenna states learned in the data channel less useful for control-packet delivery. However, for wireless protocols that employ in-band control messages such as 802.11 and LTE, and the experimental network, control packet delivery can benefit from the link statistics learned through data-packet transmissions.

LinkPursuit optimizes control-packet delivery by selecting deterministically the currently perceived "optimal" send mode at the transmitter and receive mode at the receiver based on recent pursuit statistics obtained from data transmissions. This feature is implemented using a set of software hooks that execute immediately after sending or receiving a control packet. Specifically, after a pursuit-statistics table is exchanged via the control packet, the transmitter and receiver search through the joint distribution of antenna state selection probabilities stored in their Send and Receive tables and identify the antenna mode combination with the highest selection probability. The transmitter will then use this send mode and the receiver the corresponding receive mode for control-packet transmissions until the next exchange of the pursuit statistics.

Special control-packet handling is also required in the exemplary embodiment: if the BS does not receive any uplink packet (Ack or Data) from the client in the frame, it assumes that there has been a problem with the Sync and Beacon packet deliveries and that the client has lost synchronization as a result. The BS will then update the downlink reward estimates in its Send table with zero for the send-receive mode combination (the arm) that was used to select the current control-packet send direction and attempt to reselect a new send mode for control packets. This process continues until the BS starts receiving uplink packets again and can update its Send table with the client's Receive table. The learning procedure implemented within LinkPursuit for optimal antenna state selection is summarized in FIG. 4.

Experimental Methodology

Transmission Schemes for Comparison
Omnidirectional Transmission:
All parties use the omnidirectional antenna mode for communication. This is the most common transmission scheme in practice and sets the baseline for many interference avoidance schemes.
Random Selection:
This represents a minimal implementation of directionality without the use of any intelligence when selecting antenna states. Both the BS and client randomly select an antenna state from the four available directional modes with uniform probability. Selection happens at both link ends at the beginning of each Data time slot, while control packets are still sent and received in omnidirectional mode.

Exhaustive Search (ES):

This scheme explores an infeasible implementation of directionality wherein the performance outcomes of all antenna states are known prior to measurement. In the exhaustive search scheme, the measurement procedure sweeps through all available directional antenna state combinations: 16 for each individual link and 256 for the two-link network. Then, the optimal antenna configuration is determined using a posteriori knowledge as the one with highest downlink sum rate across all links. Using this "after-the-fact" selection approach, the ES scheme is perceived to have global knowledge of the channel conditions associated with all antenna states at the start of experiment, yet it lacks the adaptation capabilities of LinkPursuit. If there are no abrupt environmental changes that deteriorate the reward of a previously optimal antenna combination greatly, the ES scheme represents the upper performance bound for the LinkPursuit learning policy.

Exhaustive Search with Periodic Training (ESPT):

This is an enhanced version of the ES scheme applicable for multi-round experiments with induced environmental changes after each round. The ESPT scheme periodically conducts an exhaustive search to determine the best antenna state in each measurement round. This introduces limited adaptivity (on the order of thousands of packets) in the exhaustive search process, allowing ESPT to react to major environmental changes.

Power Compensation for Directional Modes

To ensure a fair comparison among the aforementioned schemes, the total power radiated out of each Tx antenna is normalized to the Omni case. This usually requires additional power compensation for the directional antenna modes due to their greater return losses. Using a vector network analyzer, the return loss of the RALA's omnidirectional mode is characterized to be −9 dB (12.5% of the incident power) and that of its four directional modes to be −3 dB on an average (50% of the incident power). Thus, for normalization, the incident power sent to directional Tx antennas is increased by 75%. This is accomplished by compensating the directional antenna modes with an additional 2.5 dB in Tx RF gain over the omnidirectional case.

Measurement Procedure

For each transmission scheme the PDR and downlink throughput are measured at each client. Each data point presented in the plots conveys the results of one measurement round under a particular antenna setting. A round consists of 100 TDMA frames sent over the air with a fixed allocation of 33 downlink slots and 1 uplink slot per frame. For the ES scheme, a measurement round is repeated for every possible antenna combination, and the optimal results are presented. Experiments are conducted on a relatively quiet, unused WiFi channel: 802.11 channel 14 at 2.484 GHz. The PHY settings are set fixed at QPSK with code rate 1/2, yielding a consistent PHY data rate of 12 Mbps.

Performance Evaluation

LinkPursuit's performance is evaluated through real-time over-the-air transmissions under both non-interfering single-link scenarios as well as scenarios involving two concurrent interfering links.

LinkPursuit as an Anti-Jam Technique

In small-cell networks co-channel interference can be unintentional, originating from other legitimate nodes in the vicinity, or deliberate, under control of an adversarial jammer. Directional antennas can significantly enhance the jamming resilience of a femtocell network by enabling beam-steering to place a null toward a jammer while minimally affecting the desired signal. A communication scenario under adversarial jamming may be considered where spread spectrum and error-correcting code are insufficient to combat the jammer. LinkPursuit's functionality is evaluated as an anti jam communications technique.

Figure 5A:
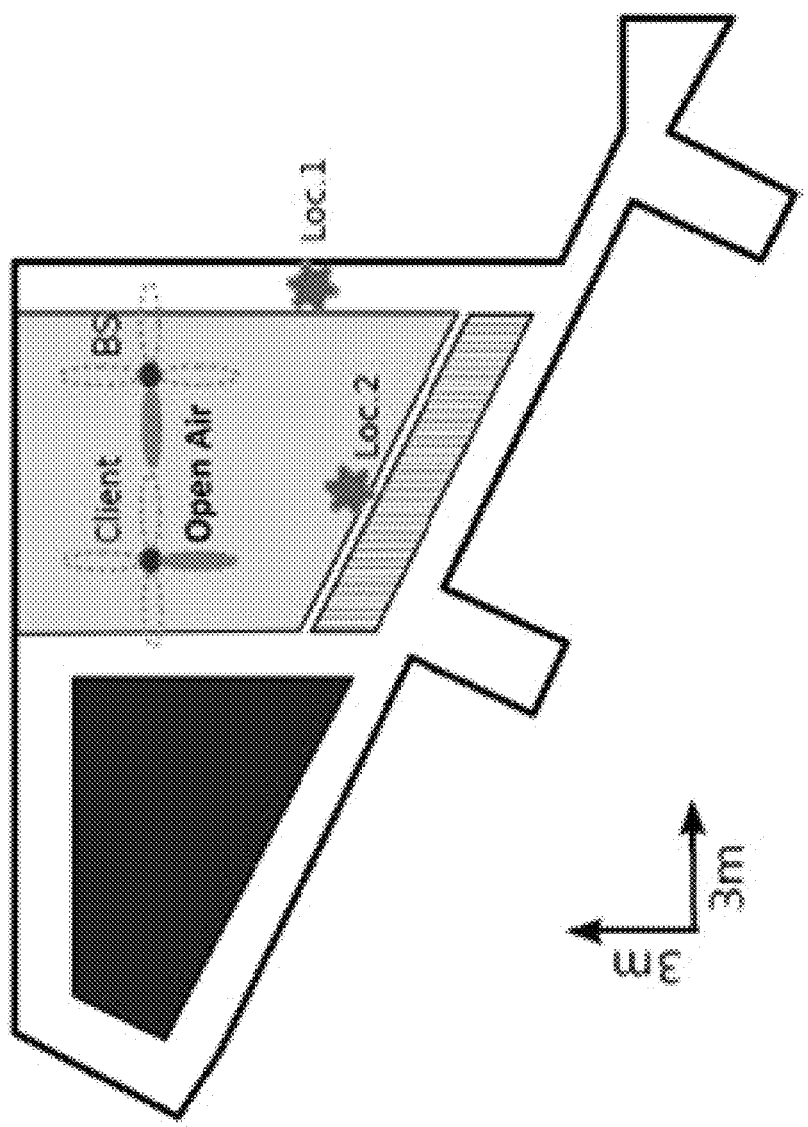
FIG. 5A illustrates the jamming resilience of directional transmission scheme with reference to an adversarial jamming setup.

To facilitate the experiment, a single BS-client link is established in an open space of an office building using two WARP nodes, both equipped with reconfigurable antennas for dynamic directionality. Network nodes run the base WARP-TDMAC protocol outfitted with the various antenna control schemes previously described. The normalized Tx power is maintained constant at roughly 0 dBm, which is accomplished by setting a Tx RF gain of 15 dB. The network nodes maintain fixed positions throughout this experiment. FIG. 5A shows the network topology and possible jammer locations 1 and 2.

Experimental Setup

Jammer Implementation:

On the adversary side, an in-band, omnidirectional, and continuous jammer is employed to generate deliberate interference. The jammer is implemented using GNU Radio (http://gnuradio.org/redmine/projects/gnuradio) and the USRP N210 SDR platform (https://www.ettus.com/product.), based on an FPGA-modified jammer design described by D. Nguyen, et al., in "A Real-Time and Protocol-Aware Reactive Jamming Framework Built on Software-Defined Radios," In Proc. of ACM SRIF '14, 2014. The jammer continuously generates a pseudorandom White Gaussian Noise (WGN) signal with 25 MHz bandwidth. Due to the platform discrepancy, the Tx output power of the USRP jammer is characterized at different RF gains also in dBm scale. This allows for fair comparison in terms of the transmit power ratio between the jammer and WARP radios during a jamming power sweep. A jam-to-signal Tx power ratio (JSR) sweep is performed from −15 to 15 dB in increments of 3 dB and the resulting downlink PDRs of different transmission schemes are reported.

Jammer Mobility:

To investigate LinkPursuit's performance in a dynamic environment, the jammer is permitted to have mobility during operation. Specifically, both a fixed location jammer and a nomadic jammer that moves around looking for the most effective jamming location are considered. The fixed location jammer is randomly placed in the vicinity shown in FIG. 5A at Location 1. To emulate a nomadic jammer, the USRP jammer is moved from its initial position to a new location (denoted as Location 2) after a measurement round. The two locations are chosen to be of equidistance to the link receiver (e.g., the client) in order to minimize path loss effects. Another measurement is then conducted round at the new location and the results for the omni, random, and LinkPursuit schemes are averaged. For the ES scheme, measurement results of each antenna mode are averaged across two locations, and then the highest performing antenna mode is selected. For the ESPT scheme, the highest performance results from each measurement round are selected and averaged.

Fixed Location Jammer

Figure 5B:
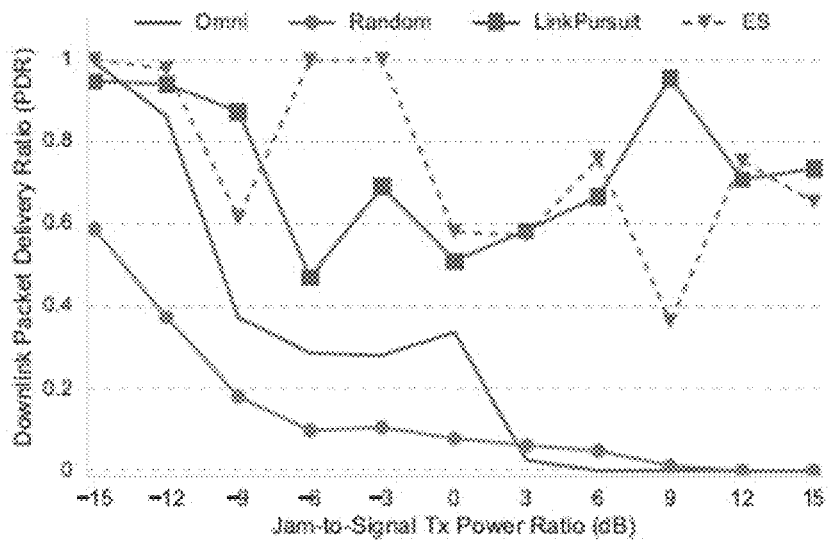
FIG. 5B illustrates the jamming resilience of directional transmission scheme with reference to a fixed location jammer.

The downlink PDRs of different directional transmission schemes are shown in FIG. 5B for the fixed location jammer scenario. For omnidirectional transmissions, the effects of jamming are pronounced. The small-cell link experiences drastic drops in PDR as the jam-to-signal Tx power ratio increases from −15 dB to 0 dB. Complete link outage occurs starting at a 3 dB JSR onward. The random selection scheme has substantially inferior performance to Omni, with a 40% PDR reduction at −15 dB JSR. This performance gap decreases gradually with stronger interference, yielding only a 20% PDR loss at 0 dB JSR. Furthermore, the random scheme can maintain link traversal, albeit at very low PDR (less than 10%), up until 9 dB JSR, giving it a 6 dB anti-jam gain (in terms of link traversal) over Omni.

LinkPursuit and the ES scheme are more resilient to jamming than Omni and Random. LinkPursuit maintains on an average over 60% PDR across the range of jamming powers, and its performance is tangential to that of ES. Except for two JSR cases at −6 and −3 dB, LinkPursuit's performance stays within 10% or even exceeds the ES scheme. For the occasions where LinkPursuit yields higher PDRs than ES, as observed at −9, 9, and 15 dB JSRs, there are a few possible reasons.

First, LinkPursuit responds to environmental changes at fine-grained granularity on per packet basis. If an optimal antenna mode becomes underperforming temporarily due to multipath effects, the algorithm quickly searches for another mode to use. In contrast, the ES scheme decides antenna configuration only once using global a posteriori performance knowledge of all available modes. This knowledge is obtained through an entire measurement round, with all transient environmental changes already assimilated. This implementation trait leads to a lack of adaptivity in ES, but it is a reasonable trade-off given the prohibitive cost of acquiring global performance knowledge and the short length of the measurement round. Thus, ES performance is optimal and upper-bounding LinkPursuit only if there has not been any change in channel conditions during the exhaustive sweep.

Second, LinkPursuit has a mechanism to optimize its control packet delivery (Syncs, Beacons, and Acks) through directionality, whereas all other schemes use the omnidirectional mode for them. Control packets are critical for all considered schemes, as link throughput is only accounted for the TDMA frames where the client is synchronized. In all of the experiments, Tx power scaling for control packets has also been enabled, e.g., sending them with maximum RF gain on WARP (31 dB). Nevertheless, when facing a high-power jammer, omnidirectional transmission of control packets can still suffer non-negligible losses, yielding abnormally low PDRs in the ES scheme. Using adaptive directional transmission for both control and data packets, LinkPursuit can avoid TDMA protocol-dependent performance loss.

Nomadic Jammer

Figure 5C:
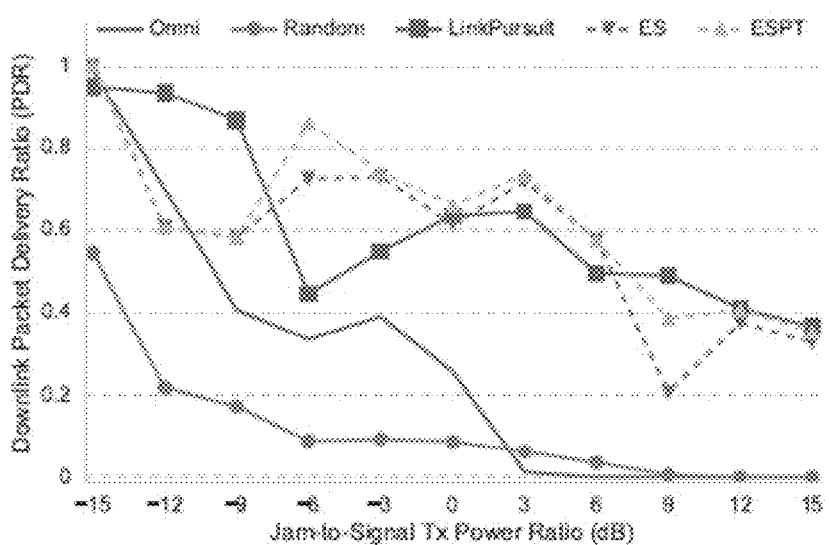
FIG. 5C illustrates the jamming resilience of directional transmission scheme with reference to a nomadic jammer.

FIG. 5C depicts the network's downlink PDR in the presence of a nomadic jammer moving from Location 1 to 2 during operation. It is observed that the Omni and Random schemes are largely oblivious to the jammer's mobility. Since the jammer moves at equal distances to the receiver/client, the difference in jamming effects between two jammer locations should not depend on channel attenuation. Rather, it embodies the multi-path variations and change in the angle of arrival of the jamming signal's line of sight (LOS) component. Neither Omni nor Random scheme makes an effort to be adaptive to these changes. As a result, the cumulative jamming effect on these schemes over multiple locations exhibits largely the same trend as in the fixed location jammer scenario.

The PDRs of both LinkPursuit and ES deteriorate as the jammer moves around looking for an effective jamming location. In the present case, the nomadic jammer happens to be more destructive at Location 2, as indicated by the reduction in average link throughput. The effects of jammer mobility are much more pronounced for the ES scheme. An average 20% PDR loss across the JSR range is observed. The lack of environmental adaptivity prevents ES from maintaining its anti jam performance across multiple jammer locations. This drawback can be compensated with periodic training and reselection, as seen in the ESPT scheme. Recall that in ESPT, an exhaustive search is performed multiple times during the experimental run (one for each jammer location) and the highest results from all searches are combined. As a result, ESPT outperforms ES in those cases where the jammer's mobility affects the optimality of certain antenna states from one location to the next. This can be observed, for example, at −6, 0, and 9 dB JSRs.

Overall, LinkPursuit gives consistent PDR performance that tracks closely both ES and ESPT schemes. Furthermore, LinkPursuit adapts well to environmental changes and the jammer's mobility, yielding significantly higher PDRs than exhaustive search on multiple occasions (e.g., at −12, −9, and 9 dB JSRs). These results validate LinkPursuit's performance as an effective anti jam technique.

Microbenchmark Verification

Figure 6:
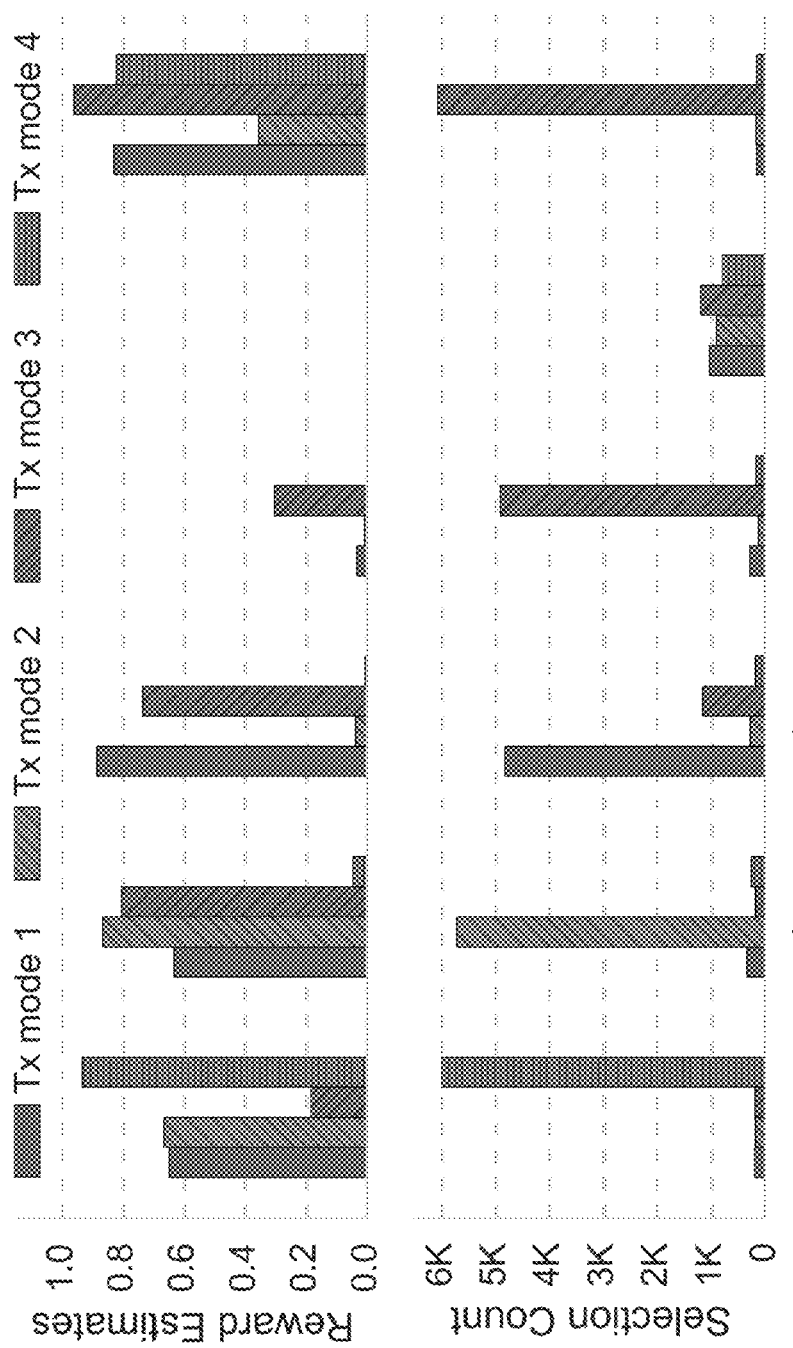
FIG. 6 illustrates exemplary reward estimates and selection counts.

We set up a single BS-client link in a typical indoor office environment to verify LinkPursuit's ability to estimate and adapt to changing reward conditions. In this experiment, the BS uses a reconfigurable antenna while the client operates with an omnidirectional dipole antenna. The real-time network operations are periodically frozen after 200 TDMA frames (6600 downlink packets) to inspect the pursuit statistics on the antenna adaptation process and induce artificial environmental changes, such as disabling (grounding control pin to reduce antenna gain) the currently perceived "optimal" Tx antenna mode. The verification procedure starts with all Tx directional modes active and then selectively disables among the remaining modes the current best Tx mode with the highest reward estimate after each 200-frame round FIG. 6 shows the reward estimates and selection counts of the four possible directional Tx antenna modes as perceived and selected by LinkPursuit at the end of each round. Since we used an omnidirectional antenna at the receiving client, we aggregate the performance metrics of each Tx mode across all Rx antenna modes and present them. We observe that during each measurement round, the number of times a Tx antenna mode is selected consistently tracks its reward estimates. The current highest-reward Tx mode is selected the majority of the time, and a small fraction of time is necessarily spent exploring the remaining modes for adaptation. Once a mode becomes suboptimal (or this case disabled), its reward is correctly updated within a single 200-frame round.

Impact of Directionality on Spatial Reuse

This section investigates the potential increase in spatial reuse opportunities offered by directionality and realized through LinkPursuit. In particular, LinkPursuit's performance is quantified in an interference-limited environment with two concurrent BS-client links.

Experimental Setup

Figure 7:
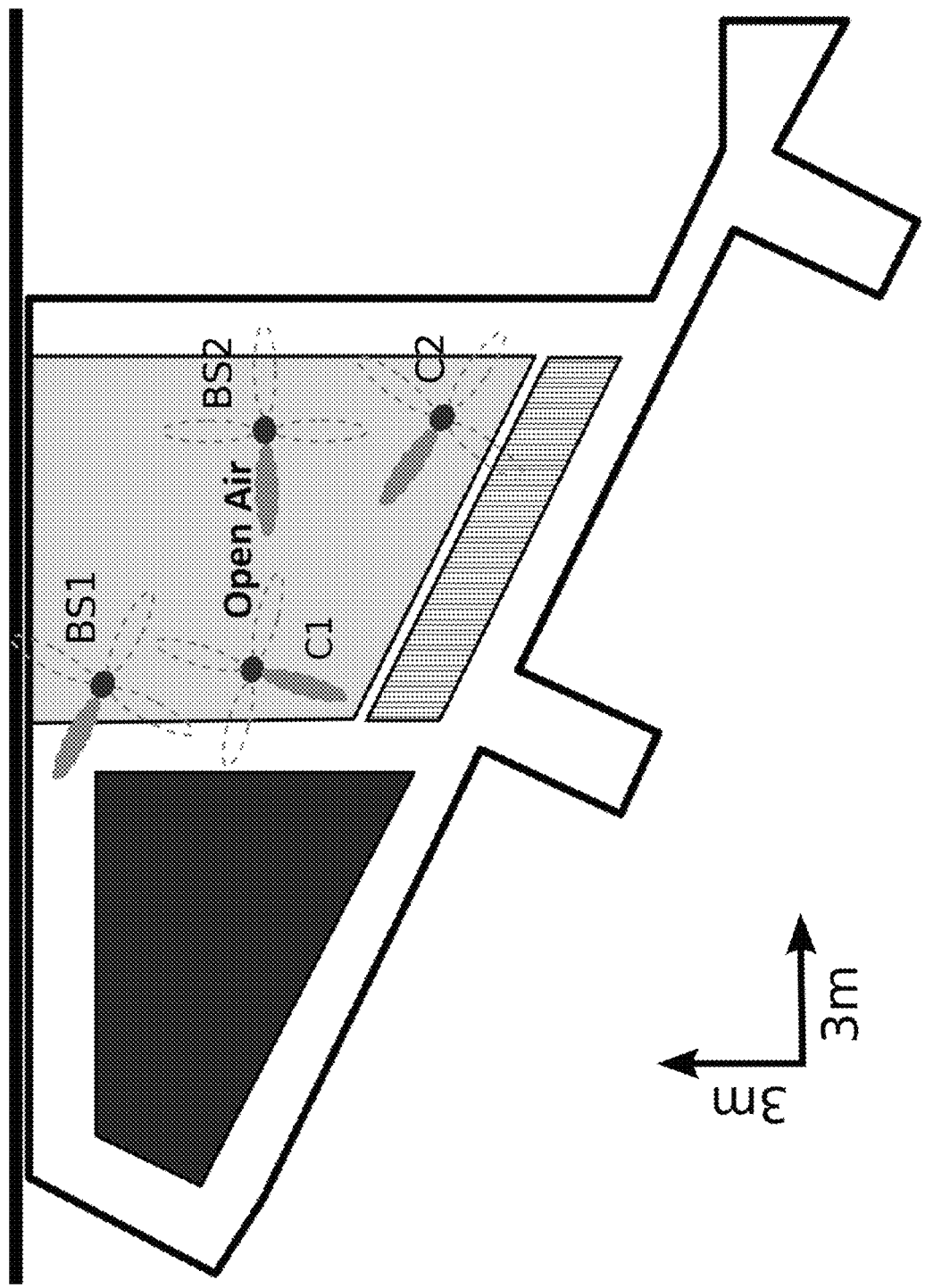
FIG. 7 illustrates the two-link interference measurement setup.

Two BS-client links are set up within the same vicinity indoor with a distance of 10 m between the two BSes. The first BS is designated as the main BS, which will provide a common time base for other network nodes through its Sync packets. Each BS is serving its respective client (labeled as C1 and C2) that is situated 3 m away from itself in the same direction. The measurement topology is shown in FIG. 7.

Figure 8:
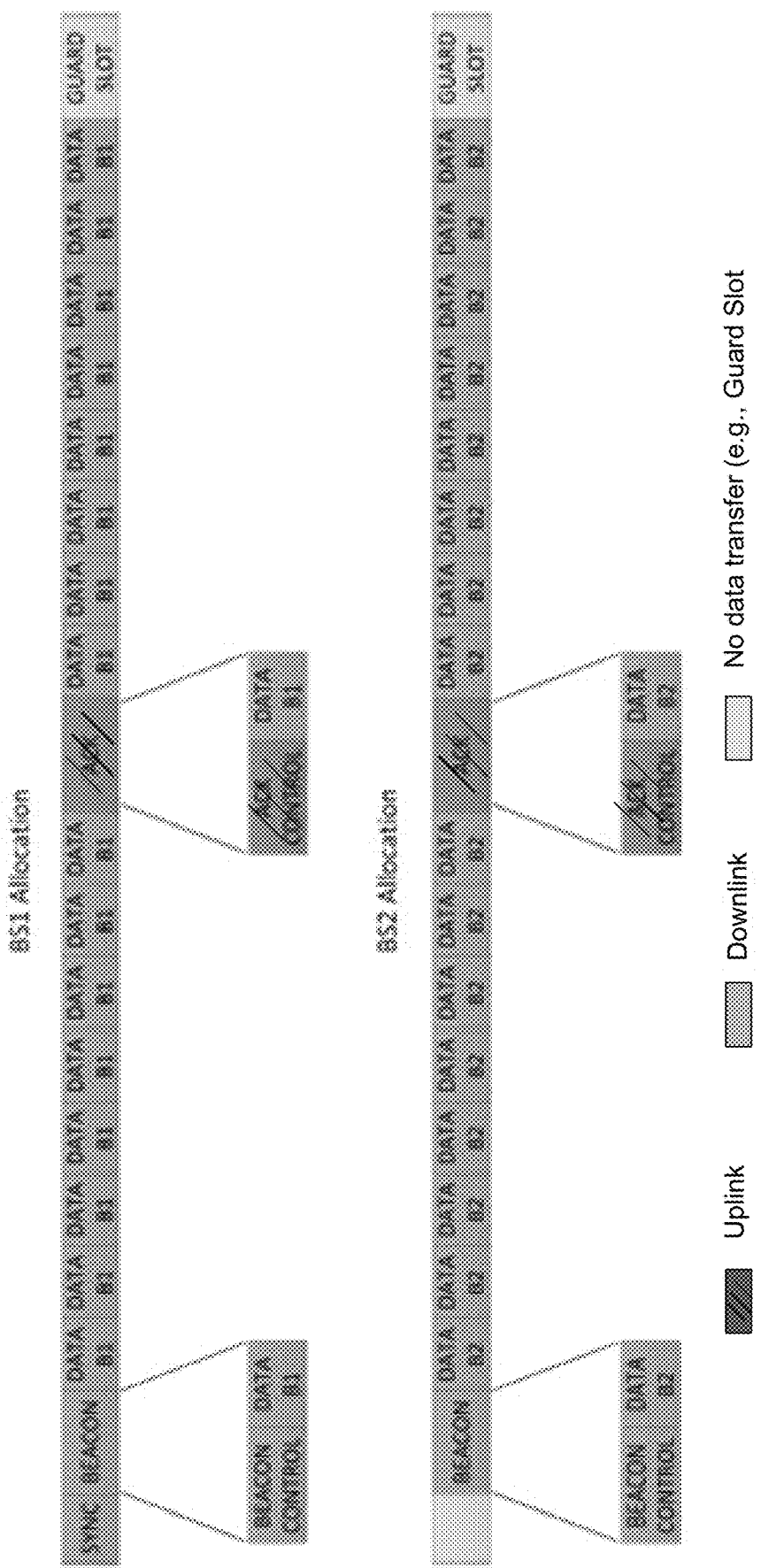
FIG. 8 illustrates two-link interference scheduling for measurement.

Reconfigurable antennas are equipped at each node. To set up a real-time interference (IF) environment, both BSes are scheduled to transmit concurrently to their respective client in every downlink DATA slot. FIG. 8 depicts this scheduling scheme. Except for the Beacon and Ack control packets which are orthogonalized in time, all other downlink transmissions will interfere.

IF Reduction at Different Tx Power Levels

When two omnidirectional transmissions collide in time, the signal-to-interfere-plus-noise ratio (SINR) at the receiver effectively determines the link outage probability. If both BSes transmit with similar power levels, depending on the topology, cross-interference can render one or both links unusable. As a result, random access MAC protocols such as IEEE 802.11 requires all other nodes in the vicinity to stay silent after detecting an active transmission. On the other hand, controlled access protocols employ dynamic resource allocation and site planning to mitigate co-channel interference.

Directionality augments existing approaches to spatial reuse with the ability to conduct spatial filtering. Using directional antennas, a node can selectively transmit and receive signals to and from only certain desired directions. This can enhance the SINR in two ways: higher directivity gains in the direction of transmission, and lower interference powers from unwanted directions. An experiment is set up to study LinkPursuit's performance on a network scale under various levels of cross-link interference. Under the same topology shown in FIG. 7, the transmit powers of both BSes are sequentially increased by adjusting their Tx RF gains. In the omni case, this has limited effect on the received SINRs since the relative power ratio between the two transmitters remains the same throughout. In directional cases, the Tx power sweep increasingly lessens the interference suppression capabilities of Rx directional antennas and intensifies the effects of beam orientation errors.

Figure 9:
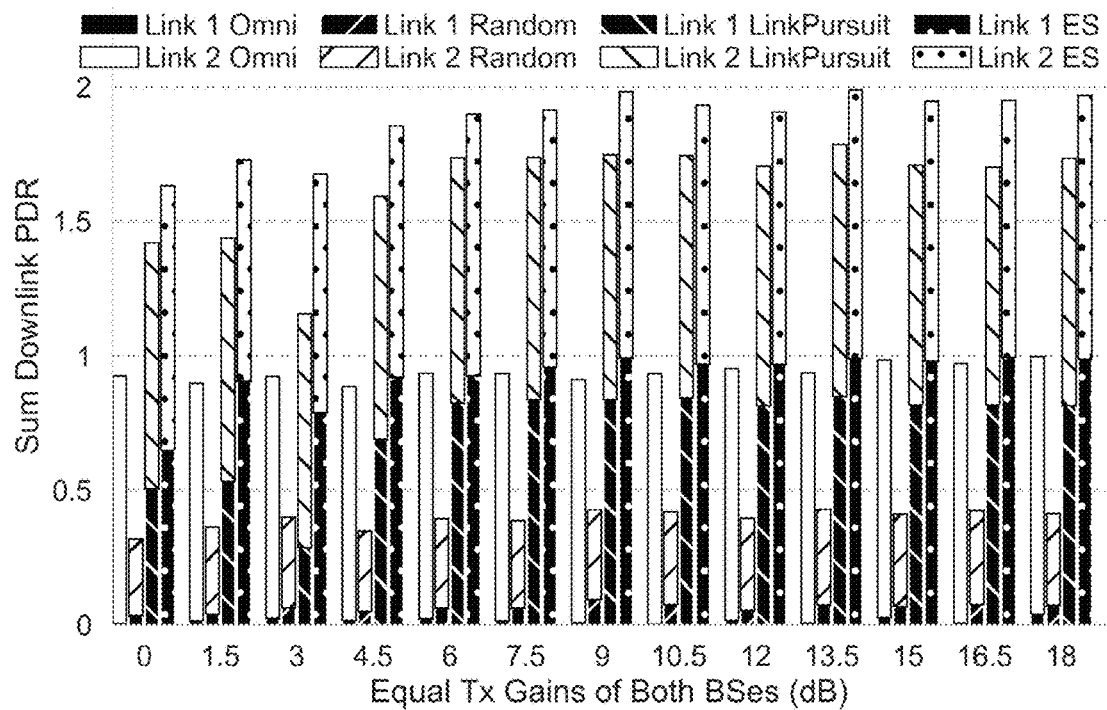
FIG. 9 illustrates interference reduction at different Tx power levels.

FIG. 9 shows the downlink PDRs of the different transmission schemes across the range of Tx powers. In the omni scenario, due to severe cross-link interference, only Link 2 can sustain a usable PDR. Client C1 is completely dominated by the interfering signals from BS2, as can be inferred from the topology, and fails to decode its intended signals free of errors. Spatial reuse is therefore non-existent in the omni case. In contrast, the sum rate (total throughput) of LinkPursuit consistently exceeds that of omni by 74% on average. Most of this sum rate improvement stems from the PDR increase of Link 1—the weaker link in the omni case. LinkPursuit delivers usable PDRs for both BS-client links without hurting performance of the dominant link from the omni case. Furthermore, this spatial reuse gain of LinkPursuit persists across the range of transmission powers.

The accuracy and quality of LinkPursuit's learning decisions may also be observed in FIG. 9. LinkPursuit consistently delivers close to 90% of the sum rate achieved by the a posteriori exhaustive search scheme. The remaining performance gap is within reason for the implementation of LinkPursuit adopts a 90/10 exploitation-exploration ratio at all times. Further tuning of LinkPursuit parameters can potentially close down this performance gap, albeit at the cost of diminished environmental agility.

IF Suppression at Different SINRs

Figure 10:
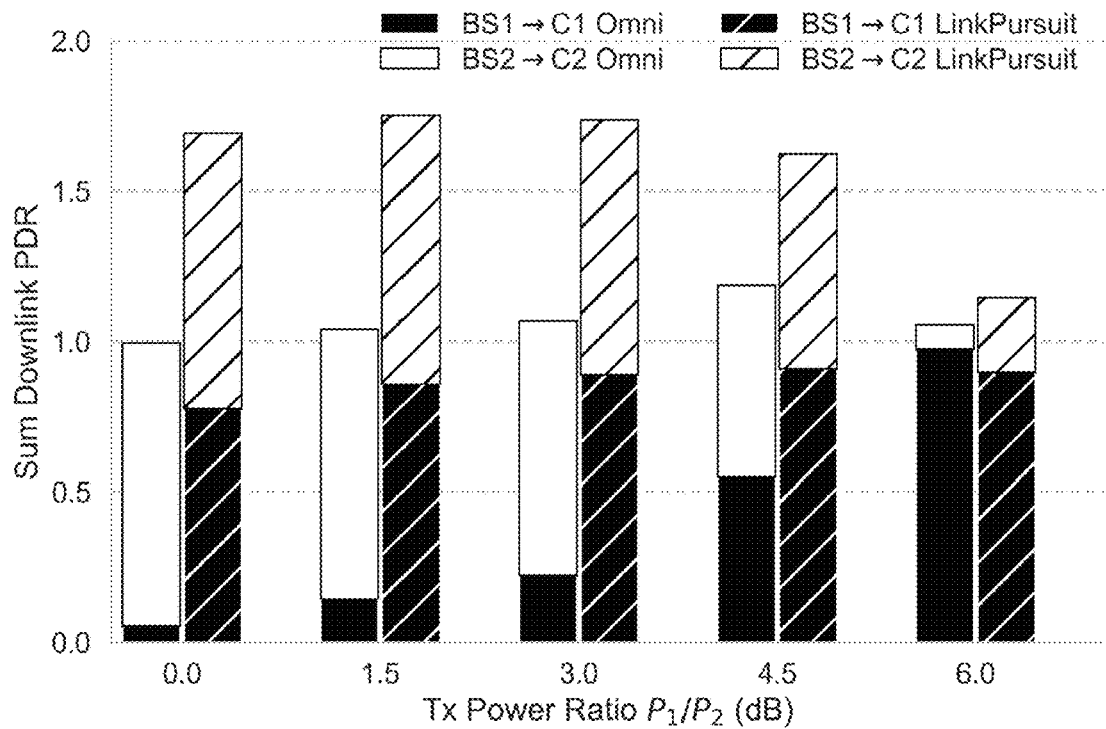
FIG. 10 illustrates a downlink sum rate at different SINRs.

This section investigates LinkPursuit's performance under asymmetrical interference conditions. To achieve this, the Tx power of BS2 is kept constant (fixed with 30 dB Tx RF gain) and BS1's Tx power is gradually increased to generate fluctuating SINRs at both clients. FIG. 10 depicts the downlink sum rate achieved under these conditions.

In the Omni case, the throughput of a link is highly dependent on its Tx power ratio to the interference source. Due to its uniform proximity to both BSes, client C1 experiences stronger interference than C2 in general, thereby yielding much lower SINR and throughput. This topology-induced loss can be compensated by increasing BS's Tx power with respect to BS2, but at the price of a corresponding decrease in link 2's performance. The best-case scenario is hard to find, highly volatile, and often yields only a fraction of the maximum achievable throughput. In contrast, LinkPursuit delivers well-balanced, close to optimal link throughputs across the range of power ratios. This capability greatly simplifies the task of interference management and ensures reliable quality of service for users.

The design, implementation, and evaluation of LinkPursuit has been presented. LinkPursuit is a novel learning protocol for distributed antenna state selection in directional cognitive small-cell networks. LinkPursuit incurs low overhead and adapts quickly to environmental changes through probabilistic selection at each time step. The experimental results confirm that coordinated directional transmission provides significant advantages over omnidirectional transmission in terms of resilience to deliberate or unintentional interference from other nodes. When jammed continuously, LinkPursuit achieves a 12 dB anti jam performance gain in link dropout prevention, and this efficacy degrades very little even when the jammer becomes mobile. It also achieves a 74% sum throughput improvement over omni when both base stations transmit concurrently at the same power levels and a 40% increase when they transmit with disproportionate power.

However, LinkPursuit is not without limitation. First, due to its fast adaptation nature, LinkPursuit necessarily allocates a certain percentage of selections for exploration. This makes LinkPursuit fall short of exhaustive search or channel training-based protocols under a slow-changing environment, as exemplified in the results. Second, LinkPursuit optimizes link throughput greedily on a per-link basis, so it often disregards potential sum rate improvement from network cooperation. Automated parameter tuning of LinkPursuit's operations in terms of adaptation rate a and learning rate (3 may be explored in alternative embodiments, which will enable adaptive exploration-exploitation ratios and can further improve performance. Effort is also warranted to consider the benefits of network cooperation in LinkPursuit. For example, the femtocell base stations can exchange pursuit statistics through the backbone to facilitate joint antenna mode selection across links.

Those skilled in the art also will readily appreciate that many additional modifications and scenarios are possible in the exemplary embodiment without materially departing from the novel teachings and advantages of the invention. Accordingly, any such modifications are intended to be included within the scope of this invention as defined by the following exemplary claims.

Disclosed below is more details with regard to the hybrid synchronization method. The achievable accuracy of this synchronization method is sub-microsecond (less than 1 us). This may be achieved using a combination of techniques: software timestamping, Ethernet-based synchronization protocol, digital phase-locked loop, or wireless reference broadcast synchronization.

A hybrid wired-wireless time synchronization method targeting enterprise WLAN networks may enable deployments of distributed wireless PHY protocols. The method may synchronize network APs on the Ethernet backhaul using the IEEE 1588 Precise Time Protocol, while client devices (herein clients) are synchronized to their home AP via reference broadcast synchronization. This synchronization primitive was tested on WARP software-defined radios and evaluated through a microbenchmark involving a plurality of network links. The test results verified that the method achieves sub-microsecond synchronization accuracy among network nodes and therefore serves as an effective building block for protocol development.

Fine-grained time synchronization in wireless local area networks (WLANs) poses a significant barrier toward realizing the benefits of recently proposed physical layer signaling techniques, including distributed MIMO, uplink multi-user MIMO, and network MIMO. These systems promise dramatic, multiplicative increases in network capacity by extending the well-known concept of MIMO spatial multiplexing to a distributed set of antennas placed on different Access Points (APs) or clients. Typically for such transmission scheme to work, the cluster of APs or clients are required to maintain precise frequency and time synchronization to be centrally scheduled for joint transmission. Frequency synchronization allows the distributed transmitters to minimize frequency and phase offsets and appear as a coherent virtual MIMO transmitter. Time synchronization may be used to ensure that concurrent transmissions align their symbol boundaries within a tolerable precision, typically on the order of an OFDM cyclic prefix interval (e.g., 800 ns for 802.11a/g/n) to avoid inter-carrier (ICI) and inter-symbol interference (ISI). In a conventional scenario, achieving this sub-microsecond synchronization requirement across widely distributed nodes that span multiple WLAN service sets remains a challenging task.

Traditional time synchronization methods in WLANs tend to focus on using the air interface to synchronize clocks over multiple hops. While these methods may achieve the desired submicrosecond accuracy, they require multiple rounds of message exchanges and reduce the wireless network capacity with synchronization overhead. In other research, it has been noticed that the Ethernet backbone connecting APs in an enterprise WLAN can be leveraged to realize a hybrid wired-wireless synchronization approach. The other research propose the use of IEEE 1588 Precise Time Protocol (PTP) with hardware-supported timestamping on the backhaul to synchronize APs together, while employing its wireless variant for AP-client synchronization. Since a homogeneous time base is needed across two different communication technologies, the researchers opted for the Ethernet-domain clock as the primary timing source and utilize the air interface simply to transport application-layer PTP messages. As such, this approach by the other researches bypasses altogether the WLAN time notion and its supported Timing Synchronization Function (TSF), thus incurring additional overhead on the wireless interface.

Disclosed herein a different approach and use is taken of the 802.11 TSF as the main timing source and sole over-the-air synchronization routine. Disclosed herein is an alternative hybrid time synchronization method in which the APs are synchronized on the Ethernet backbone using PTP with software timestamping, and the clients are synchronized to their home APs wirelessly through the reference beacon broadcasts supported by 802.11 TSF.

This synchronization mechanism was tested on the Wireless open-Access Research Platform (WARP) and conduct real-time timing measurements involving four APs and four network clients. The results show that the new method achieves the required sub-microsecond accuracy to support distributed wireless PHY signaling, while incurring lower airtime overhead by utilizing the 802.11 TSF and a simpler PTP implementation on the backbone.

Figure 11:
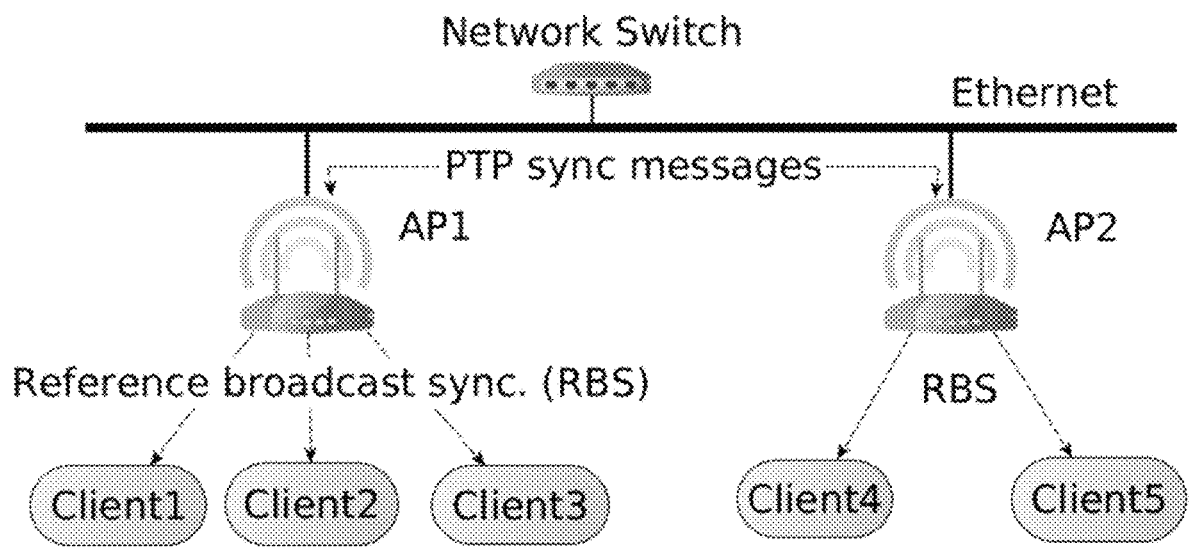
FIG. 11 illustrates an exemplary network using a hybrid synchronization method.

An exemplary hybrid synchronization architecture is depicted in FIG. 11, with four major components as detailed below.

Figure 12A:
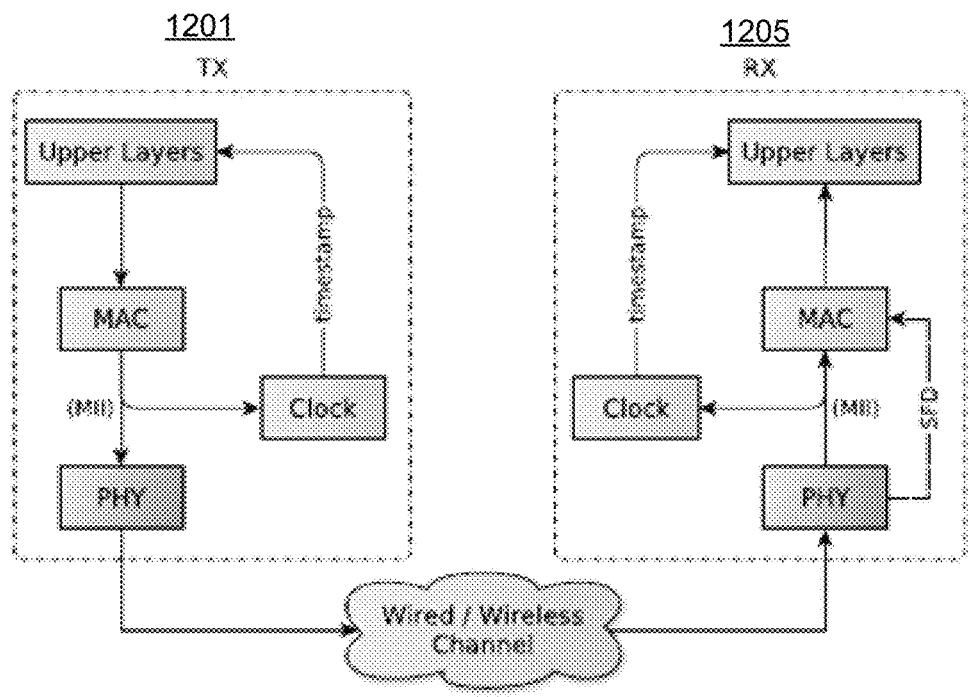
FIG. 12A illustrates an exemplary MAC-layer timestamping during message transport.

MAC-layer timestamping: High-accuracy time synchronization should have a robust timestamping method that minimizes transmission delay jitter during delay measurements. A software timestamping approach is taken, where the timestamps are drawn directly by the synchronization software stack during message processing. To minimize transmission delay jitter over both the wired (on APs only) and wireless interfaces, an approach is to timestamp the sync messages at the MAC layer, using the current time from a single system-wide shared WLAN timer. This timestamping approach is depicted in FIG. 12A. On the transmitter side 1201, sync messages are timestamped by the MAC firmware after it has contended for channel access and is ready to start transmission of a buffered PHY packet. On the receiver side 1205, sync messages are timestamped following a Start-of-Frame Detect (SFD) signal issued by the PHY at a deterministic and repeatable point during message reception.

Figure 12B:
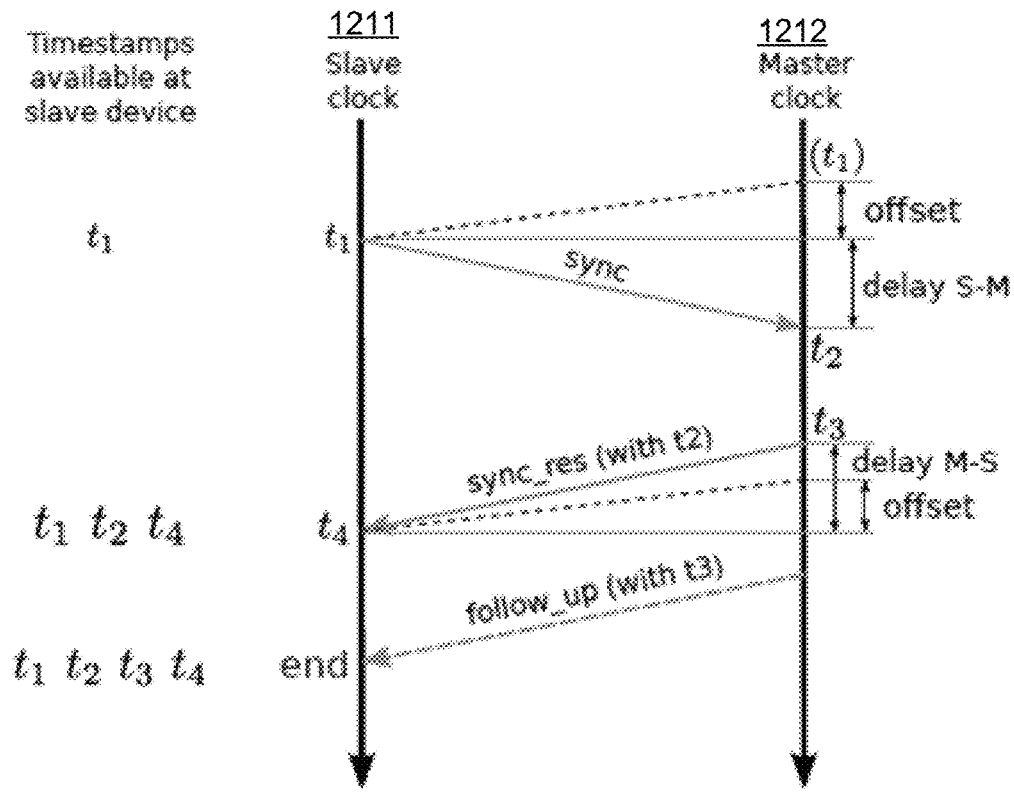
FIG. 12B illustrates an exemplary PTP handshaking protocol for delay and offset estimation over Ethernet.

AP-AP Synchronization: Network APs can be synchronized with each other to achieve a common time base using the PTP over Ethernet. PTP incorporates a two-way handshaking protocol to estimate the message transmission delay as well as relative clock offset between two arbitrary nodes on the network, and then compensates for this offset by adjusting the local system clock. This procedure works based on the assumption that the message transmission delay is symmetrically invariant for both directions, which is a reasonable assumption for direct Ethernet links or a small LAN network. As shown in FIG. 12B, each AP running PTP (e.g., AP 1211 and AP 1212) may first perform timestamp handshaking to estimate the message transmission delay and current clock offset to a designated master AP, using the four measured timestamps t1-4 as follows:

$$\text{delay}=((t2-t1)+(t4-t3))/2; \text{offset}=((t2-t1)-(t4-t3))/2$$

The offset is then used as input to adjust the slave AP's local MAC timer in order to compensate for the offset to master clock until the next re-synchronization instant.

Figure 12C:
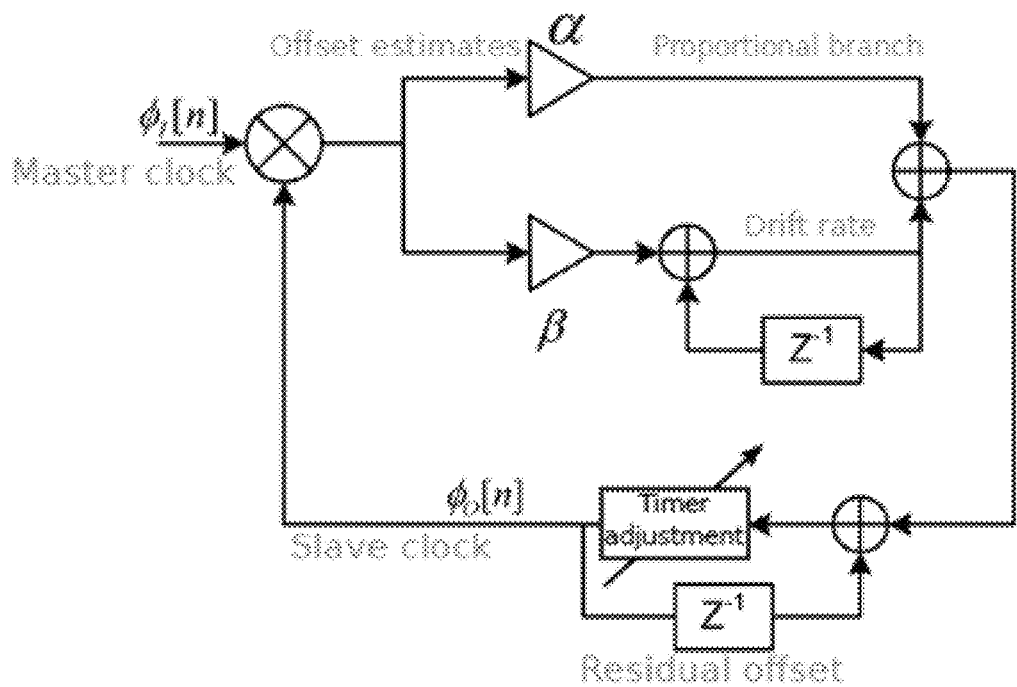
FIG. 12C illustrates an exemplary Digital phase-locked loop (DPLL) for drift rate.

Clock Offset Compensation: PTP treats the slave clock as a servo which may be driven by a proportional-integral-derivative (PID) controller based on the measured clock offset feedback. However, the protocol does not mandate specific implementations of such controller. How fast the slave clock can react to a sudden deviation in clock offset depends on the frequency of delay measurements and the behaviors of the clock adjustment servo. Timer adjustment for drift compensation also depends on the specific clock system. An tested prototype used a non-monotonic and time-adjustable clock timer. Based on the tests, it makes sense to use a Digital Phase-Locked Loop (DPLL) control structure, implemented purely in software and shown in FIG. 12C, to manage and compensate for clock drift on the slave APs. The system uses the current clock offset estimate to the master AP and produces a timer phase adjustment in terms of ticks, which can be positive (tuning forward) or negative (backward), to apply directly on the current slave timer value. It incorporates a loop filter that tracks the quality of input offset estimates on the proportional branch and the estimated drift rate on the integral branch. The loop gain parameters α and β determine the filter's damping characteristics and are tuned periodically in software during the acquisition stage (e.g., when a slave AP first comes online) to put the clock offset to within a small displacement.

The gains settle to their steady-state values when the system enters the tracking stage after a certain number of tuning rounds. Another important design parameter is the required re-synchronization interval to periodically perform PTP timestamp handshaking. This value is subject to the desired synchronization precision, and was set to 50 ms in our tests.

Client-AP Synchronization: 802.11 TSF may be relied upon to synchronize clients to their associated AP. This method incorporates a time-adjustable WLAN MAC timer and a Reference Broadcast Synchronization (RBS) scheme, wherein clients are required to update their MAC timer upon receiving the beacon signals broadcasted periodically by all APs. To improve synchronization accuracy, changes to the 802.11 TSF operations are disclosed. First, indeterministic channel contention time can incur large jitter in the beacon transmission delay. This can be addressed by (i) moving beacon broadcasts to the contention-free periods of 802.11 MAC, or (ii) employing a time-division multiple access (TDMA) MAC protocol to guarantee channel access for beacon transmissions. Second, instead of taking the beacon's send timestamp as their new TSF timer value (as specified in the standard), the clients may adjust their MAC timers based on the current clock offset, which may be estimated from the beacon's send and receive timestamps and the transmission delay. Fortunately, for one-hop wireless transmissions in an indoor environment, wireless propagation delay is negligible, and the total transmission delay (consisting of propagation and processing time) is therefore deterministic and invariant. In tests, we empirically measure this beacon transmission delay by observing the debug traces of both timestamping events on an oscilloscope. However, a simple two-way timestamp exchange at association time should suffice to derive the near-constant AP-client beacon message delay. Once a beacon message is successfully received, the client node is considered synchronized with its home AP and may use the common time base for TDMA scheduling. For a typical WLAN, this technique may achieve microsecond-level synchronization with high precision among all network nodes.

Figure 13A:
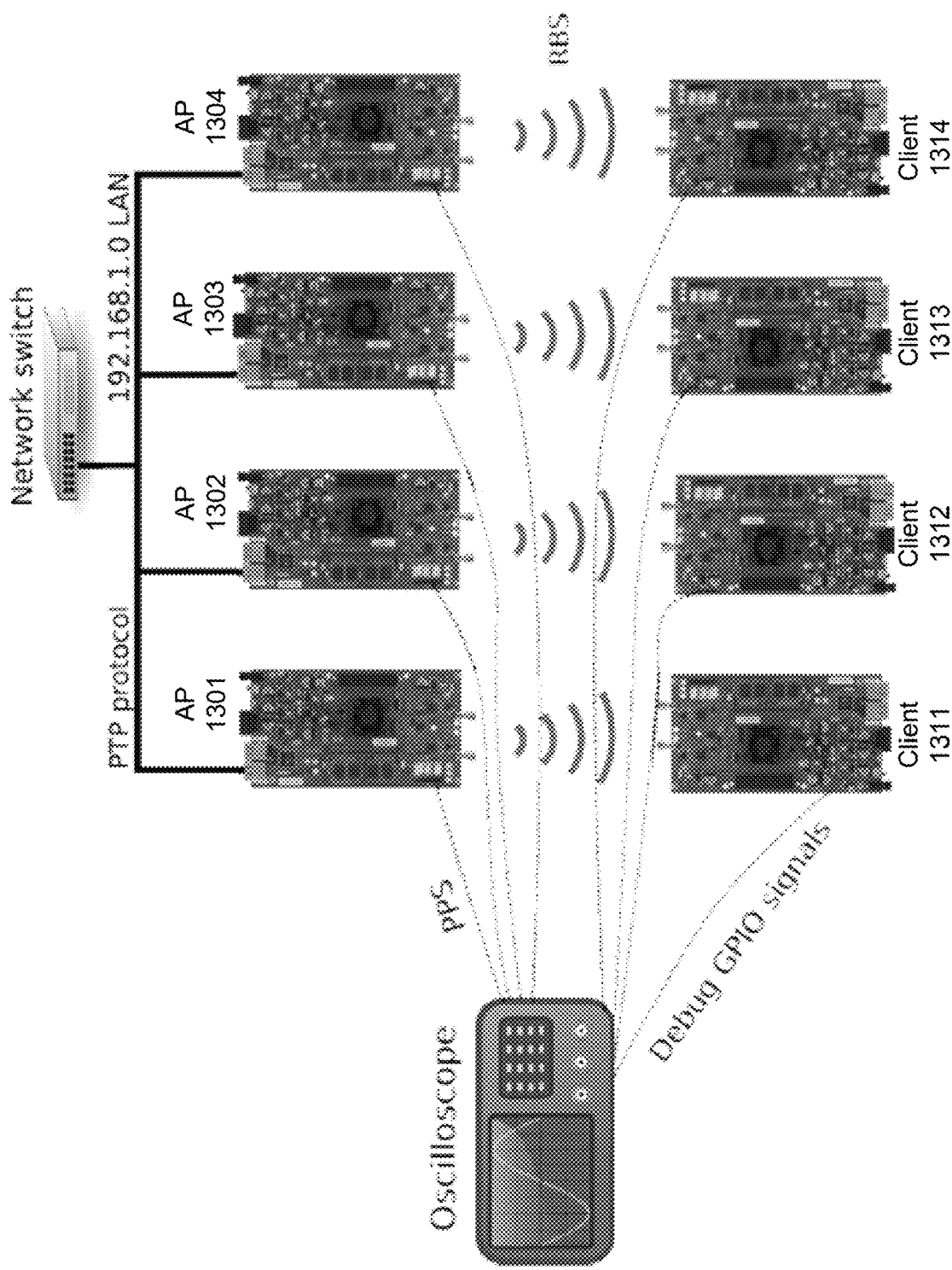
FIG. 13A illustrates an exemplary measurement setup with four AP-client wireless links.

The disclosed WLAN hybrid synchronization method was tested on the WARP v3 platform, leveraging its 802.11 Reference Design and real-time 802.11a/g/n physical layer for wireless signaling. An experiment was setup with four AP-client links to measure the achievable synchronization accuracy. FIG. 13A is an exemplary measurement setup in which the APs are numbered from 1301 through 1304, and each AP may service as a single client from its BSS. To verify the Ethernet-based synchronization accuracy among the APs, a pulse per second (PPS) signal that is raised once per second on network APs (e.g., all network APs in this test) for precise time measurement may be enabled. For over-the-air synchronization evaluation, TDMA channel access on the network nodes and implement a one-bit debug GPIO signal that is raised immediately after a 1.6 ms contention-free beacon broadcast period at the beginning of each 60 ms TDMA frame. Both the PPS and debug GPIO signals may be routed to the physical debug header onboard each WARP node and subsequently observed on a 20-GSPS oscilloscope.

Figure 13B:
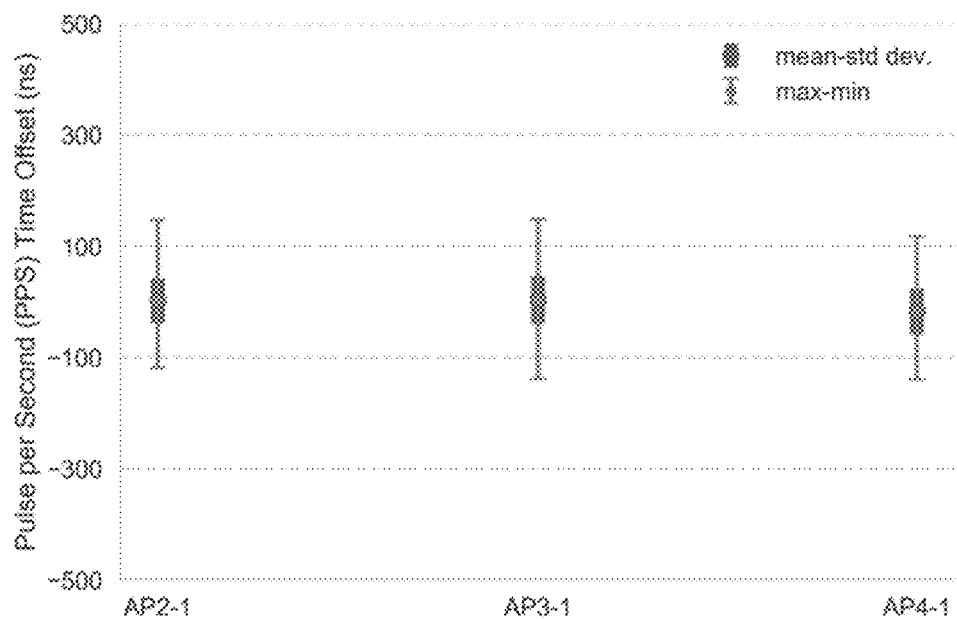
FIG. 13B illustrates statistics over 5012 samples of PPS time displacements (1.5 hour).
Figure 13C:
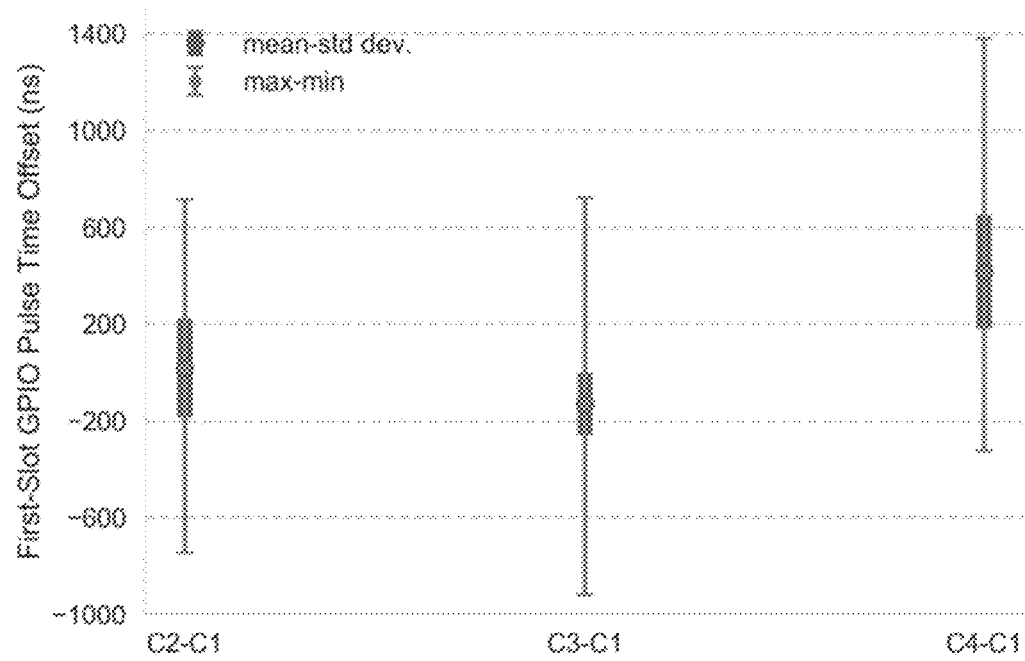
FIG. 13C illustrates statistics over 2026 samples of debug GPIO signal time displacements (2 min).

The synchronization accuracy of the network APs via the Ethernet backbone is depicted in FIG. 13B for over 5000 samples (1.5 hour period) of the time displacements between the PPS signals of AP 1302-AP 1304 and AP 1301's. The PTP protocol works well to synchronize the slave APs within 150 ns accuracy of the main AP. In addition, end-to-end measurement may be run to evaluate the synchronization accuracy among clients in the network. We set the scope to trigger on client 1311's debug signal and measures the time displacements on the same debug pulse among different client pairs. FIG. 13C shows the measurement results over 2026 TDMA frames in approximately 2 minutes. Overall, the hybrid synchronization method performs amicably to keep all network clients in tight timing agreement despite having geographically distributed timing sources. The standard deviations of the sync errors are within 100 ns for the clients and the error means are close to zero for the client 1312-client 1311 and client 1313-client 1311 client pairs. We notice a distinctly high mean synchronization error of 415 ns for the client 1314-client 1311 pair, which suggests a systematic timing bias at client 1314, possibly due to incorrect compensation for the beacon transmission delay from AP 1314. Adjusting this delay compensation will bring the mean sync error closer to zero. Once the systematic timing biases are accounted for, a network-wide synchronization accuracy within 800 ns (as indicated through the maximum sync error for each pair) may be achieved. In summary, disclosed herein is a capability that represents an effective building block toward the development of highly synchronous wireless PHY and MAC operations.

Figure 14:
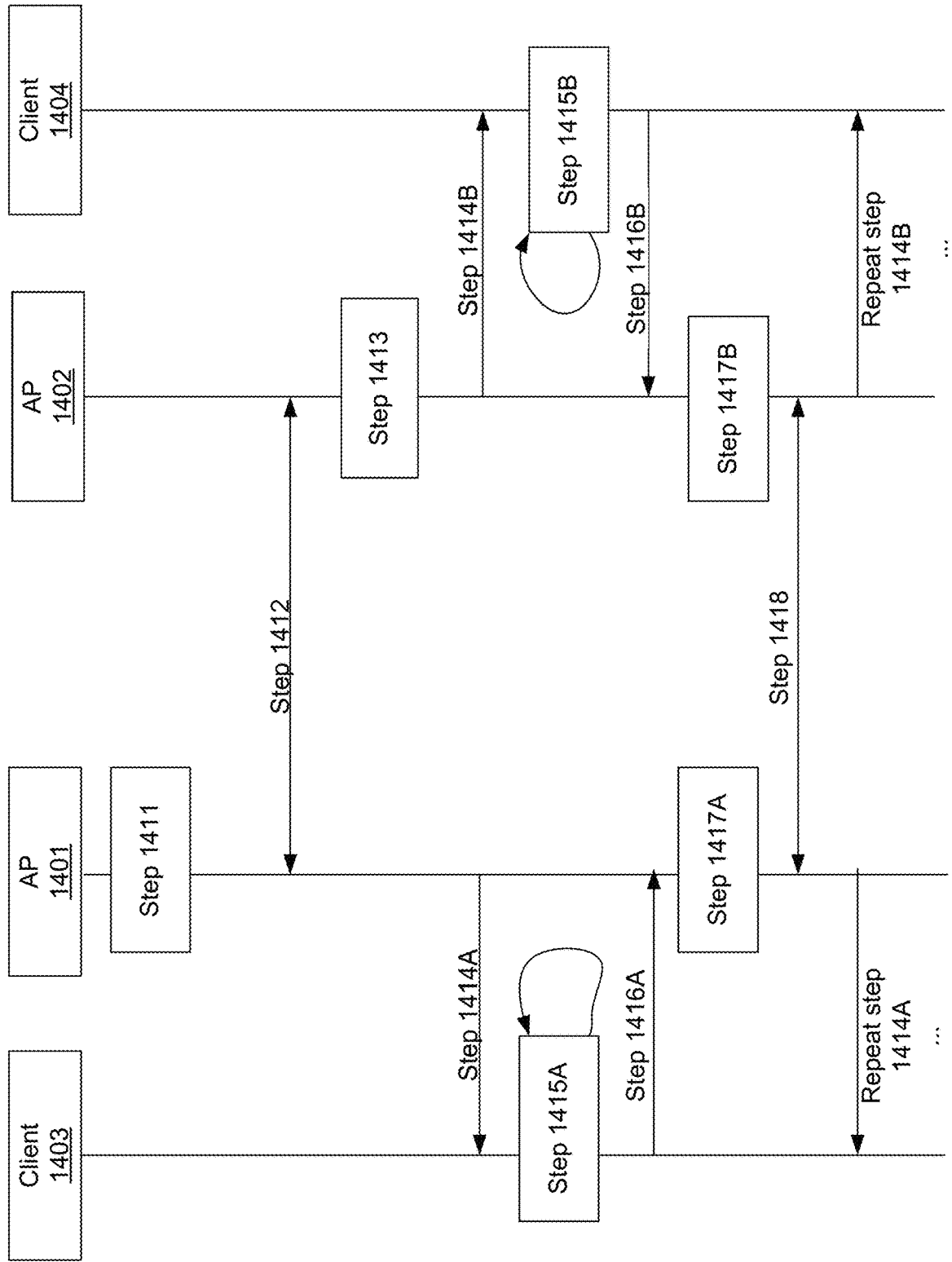
FIG. 14 illustrates an exemplary method for adaptive pursuit learning as disclosed herein.

FIG. 14 illustrates an exemplary method for adaptive pursuit learning as disclosed herein. At step 1411, AP 1401 (e.g., a master AP) starts the initialization process, reset pursuit learning statistics for its serviced links to their default values. It may start periodically computing the link schedules (together with antenna send directions) for its clients, which may be once per TDMA frame. The schedule specifies the send and receive nodes, as well as the send antenna direction, for time slots in the frame. AP 1401 may also start a timing source server over the Ethernet interface to provide timing information to other APs connecting to the backbone.

At step 1412, AP 1402 (e.g., slave AP) may comen online and start communicating with AP 1402 via the Ethernet backbone. AP 1402 runs the AP-to-AP synchronization mechanism described above to obtain a common time base with AP 1401.

At step 1413, once obtaining a common time base with AP 1401, AP 1402 may start its initialization process, such as reset learning statistics, compute link schedules, and start the TDMA frame. Each frame may include a number of time slots for transmission.

At step 1414A (and 1414B), at the beginning of each TDMA frame, APs synchronously broadcast their link schedules (through beacon control packets) to their clients in the vicinity. The link schedules carry the transmission information to be executed in the frame.

At step 1415A (and 1415B), Client 1403 (and Client 1404) (two example clients) follow the link schedules in each time slot. Client 1403 and client 1404 make decisions on receive antenna direction based on their current learning statistics and may obtain the outcome of those decisions (e.g., whether a packet is successfully received in that time slot), and update the learning statistics for the selected send-receive antenna combination. This process repeats for all downlink slots in the TDMA frame.

At step 1416A (and step 1416B), in an ACK slot of each TDMA frame, the clients send aan cknowledgment packet, which also carry their current downlink pursuit statistics, to their respective APs for link schedule computation in the next TDMA frame. This step 1416A/1416B happens synchronously for clients in the network.

At step 1417A and 1417B, at the end of each TDMA frame, APs review the current pursuit statistics of sservicing clients to compute the link schedule of the next frame. This step happens synchronously for all APs.

At step 1418, based on the ACKs received from their respective clients, the APs determine if convergence may be achieved or not (whether the links can be packed together harmonically), or some links must yield and defer transmissions. The APs (e.g., AP 1401 and AP 1402) may coordinate with each other via the Ethernet backhaul. APs are allowed to be greedy and optimize only their own links without the need to coordinate with other APs. Subsequent to step 1418 (e.g., step 1419), once new link schedules are ready for the next TDMA frame, AP 1401 and AP 1042 and Client 1403 and Client 104 may repeat steps 1414A/B-1418.

Further as disclosed herein, the following may be used to implement the disclosed system. For example, there may be a further step that may include delivering link schedules from the access points to said clients once time synchronization is achieved and providing up/downlink wireless data transmissions in a scheduled time slot. There may be a further step that may include spatially packing multiple directional access point—client links and using machine learning techniques to orient antenna beams of said nodes. There may be further step that may include coordinating the access points with each other over said Ethernet backbone to exchange learning statistics and avoid potential oscillation in finding an equilibrium for network-wide antenna configuration. There may be a further step that may include using a distributed directional antenna system to provide synchronous directional data transmissions. There may be a further step that may include electronically steering pattern-reconfigurable antennas of the distributed directional antenna system to maximize signal power in certain directions, scheduling a time slotted medium access control (MAC) protocol where multiple links can be scheduled for concurrent directional channel access on millisecond granularity, and using a distributed antenna orientation algorithm based on machine learning to maximize the individual goodput of each link. The adaptive pursuit algorithm may use a link packet delivery ratio as a reward metric that is optimized during antenna state selection. All combinations in this paragraph (including the removal or addition of steps) are contemplated as disclosed herein.

Figure 15:
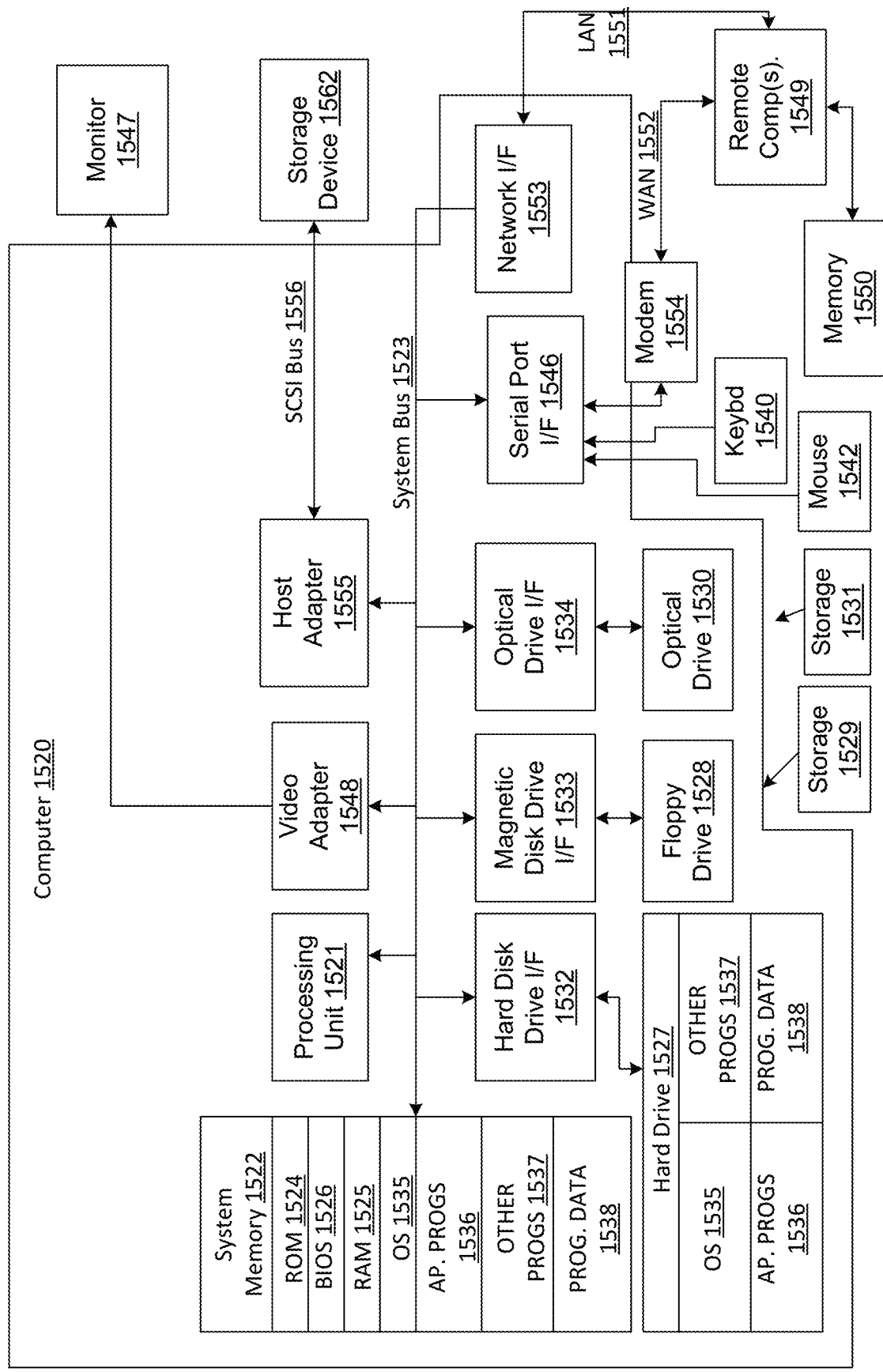
FIG. 15 is an exemplary block diagram representing a general purpose computer system in which aspects of the methods and systems disclosed herein or portions thereof may be incorporated

FIG. 15 and the following discussion are intended to provide a brief general description of a suitable computing environment in which the methods and systems disclosed herein and/or portions thereof may be implemented. The methods and systems disclosed herein may be described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 15 is a block diagram representing a general purpose computer system in which aspects of the methods and systems disclosed herein and/or portions thereof may be incorporated. As shown, the exemplary general purpose computing system includes a computer 1520 or the like, including a processing unit 1521, a system memory 1522, and a system bus 1523 that couples various system components including the system memory to the processing unit 1521. The system bus 1523 may be any of several types of bus structures including a memory bus or memory controller, a peripheral bus, and a local bus using any of a variety of bus architectures. The system memory includes read-only memory (ROM) 1524 and random access memory (RAM) 1525. A basic input/output system 1526 (BIOS), containing the basic routines that help to transfer information between elements within the computer 1520, such as during start-up, is stored in ROM 1524.

The computer 1520 may further include a hard disk drive 1527 for reading from and writing to a hard disk (not shown), a magnetic disk drive 1528 for reading from or writing to a removable magnetic disk 1529, and an optical disk drive 1530 for reading from or writing to a removable optical disk 1531 such as a CD-ROM or other optical media. The hard disk drive 1527, magnetic disk drive 1528, and optical disk drive 1530 are connected to the system bus 1523 by a hard disk drive interface 1532, a magnetic disk drive interface 1533, and an optical drive interface 1534, respectively. The drives and their associated computer-readable media provide non-volatile storage of computer readable instructions, data structures, program modules and other data for the computer 1520. As described herein, computer-readable media is an article of manufacture and thus not a transient signal.

Although the exemplary environment described herein employs a hard disk, a removable magnetic disk 1529, and a removable optical disk 1531, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1529, optical disk 1531, ROM 1524 or RAM 1525, including an operating system 1535, one or more application programs 1536, other program modules 1537 and program data 1538. A user may enter commands and information into the computer 1520 through input devices such as a keyboard 1540 and pointing device 1542. Other input devices (not shown) may include a microphone, joystick, game pad, satellite disk, scanner, or the like. These and other input devices are often connected to the processing unit 1521 through a serial port interface 1546 that is coupled to the system bus, but may be connected by other interfaces, such as a parallel port, game port, or universal serial bus (USB). A monitor 1547 or other type of display device is also connected to the system bus 1523 via an interface, such as a video adapter 1548. In addition to the monitor 1547, a computer may include other peripheral output devices (not shown), such as speakers and printers. The exemplary system of FIG. 15 also includes a host adapter 1555, a Small Computer System Interface (SCSI) bus 1556, and an external storage device 1562 connected to the SCSI bus 1556.

The computer 1520 may operate in a networked environment using logical connections to one or more remote computers, such as a remote computer 1549. The remote computer 1549 may be a personal computer, a server, a router, a network PC, a peer device or other common network node, and may include many or all of the elements described above relative to the computer 1520, although only a memory storage device 1550 has been illustrated in FIG. 15. The logical connections depicted in FIG. 15 include a local area network (LAN) 1551 and a wide area network (WAN) 1552. Such networking environments are commonplace in offices, enterprise-wide computer networks, intranets, and the Internet.

When used in a LAN networking environment, the computer 1520 is connected to the LAN 1551 through a network interface or adapter 1553. When used in a WAN networking environment, the computer 1520 may include a modem 1554 or other means for establishing communications over the wide area network 1552, such as the Internet. The modem 1554, which may be internal or external, is connected to the system bus 1523 via the serial port interface 1546. In a networked environment, program modules depicted relative to the computer 1520, or portions thereof, may be stored in the remote memory storage device. It will be appreciated that the network connections shown are exemplary and other means of establishing a communications link between the computers may be used.

Computer 1520 may include a variety of computer readable storage media. Computer readable storage media can be any available media that can be accessed by computer 1520 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1520. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The use of the word "or" is generally used inclusively herein.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for avoiding interference for a communication link, comprising:
    synchronizing a common time base between a transmitting node and a receiving node, wherein the transmitting node and the receiving node receive and transmit using directional antennas;
    based on the synchronizing of the common time base, sending a link schedule to a client of the transmitting node, wherein the link schedule is for scheduling concurrent directional channel access;
    responsive to the sending of the link schedule to the client, receiving an acknowledgment message from the client, wherein the acknowledgment message comprises pursuit statistics of the client, wherein the pursuit statistics comprise a reward metric or selection count; and
    coordinating directional transmissions between the transmitting node and the receiving node based on the acknowledgement message.

2. The method of claim 1, wherein the transmitter node and the receiver node are access points.

3. The method of claim 1, wherein the coordinating comprises delivering link schedules via beacon control packets.

4. The method of claim 1, wherein the link schedule is synchronously broadcast to the client of the transmitter node and a client of the receiver node.

5. The method of claim 1, wherein the transmitter node has transmitter antenna or a receiver antenna that is a pattern-reconfigurable antenna.

6. The method of claim 1, wherein the reward metric comprises a packet delivery ratio.

7. The method of claim 1, wherein the coordinating comprises using a distributed antenna orientation algorithm based on machine learning to improve individual goodput of a communication link of the wireless network.

8. A computer readable storage medium that is not a signal storing computer executable instructions that when executed by a computing device cause said computing device to effectuate operations comprising:
    synchronizing a common time base between a transmitting node and a receiving node, wherein the transmitting node and receiving node receive and transmit using directional antennas;
    based on the synchronizing of the common time base, sending a link schedule to a client of the transmitting node, wherein the link schedule is for scheduling concurrent directional channel access;
    responsive to the sending of the link schedule to the client, receiving an acknowledgment message from the client, wherein the acknowledgment message comprises downlink pursuit statistics of the client, wherein the pursuit statistics comprise a reward metric or selection count; and
    coordinating directional transmissions between the transmitting node and the receiving node based on the acknowledgement message.

9. The computer readable storage medium of claim 8, wherein the transmitter node and the receiver node are access points.

10. The computer readable storage medium of claim 8, wherein the coordinating comprises delivering link schedules via beacon control packets.

11. The computer readable storage medium of claim 8, wherein the link schedule is synchronously broadcast to the client of the transmitter node and a client of the receiver node.

12. The computer readable storage medium of claim 8, wherein the transmitter node has transmitter antenna or a receiver antenna that is a pattern-reconfigurable antenna.

13. The computer readable storage medium of claim 8, wherein the reward metric comprises a packet delivery ratio.

14. The computer readable storage medium of claim 8, wherein the coordinating comprises using a distributed antenna orientation algorithm based on machine learning to improve individual goodput of a communication link of the wireless network.

15. An apparatus comprising:
- a processor; and
- a memory coupled with the processor, the memory storing executable instructions that when executed by the processor cause the processor to effectuate operations comprising:
    - synchronizing a common time base between a transmitting node and a receiving node, wherein the transmitting node and receiving node receive and transmit using directional antennas;
    - based on the synchronizing of the common time base, sending a link schedule to a client of the transmitting node, wherein the link schedule is for scheduling concurrent directional channel access;
    - responsive to the sending of the link schedule to the client, receiving an acknowledgment message from the client, wherein the acknowledgment message comprises downlink pursuit statistics of the client, wherein the pursuit statistics comprise a reward metric or selection count; and
    - coordinating directional transmissions between the transmitting node and the receiving node based on the acknowledgement message.

16. The apparatus of claim 15, wherein the transmitter node and the receiver node are access points.

17. The apparatus of claim 15, wherein the coordinating comprises delivering link schedules via beacon control packets.

18. The apparatus of claim 15, wherein the link schedule is synchronously broadcast to the client of the transmitter node and a client of the receiver node.

19. The apparatus of claim 15, wherein the transmitter node has a transmitter antenna or a receiver antenna that is a pattern-reconfigurable antenna.

20. The apparatus of claim 15, wherein the coordinating comprises using a distributed antenna orientation algorithm based on machine learning to improve individual goodput of a communication link of the wireless network.

* * * * *